United States Patent [19]
Takahashi et al.

[11] Patent Number: 5,901,897
[45] Date of Patent: May 11, 1999

[54] GAS FLOW RATE CONTROL DEVICE AND BRAZING DEVICE WITH FLOW RATE OF FRIST GAS AND FLOW RATE OF SECOND GAS CONTROLLED ON THE BASIS OF SET RATIO

[75] Inventors: Mitsuo Takahashi; Takeshi Oakamura; Kazuaki Otomi, all of Osaka, Japan

[73] Assignee: Daishin Industrial Co., Ltd., Osaka, Japan

[21] Appl. No.: 08/760,561

[22] Filed: Dec. 4, 1996

[30] Foreign Application Priority Data

May 17, 1996 [JP] Japan .................................. 8-123457

[51] Int. Cl.⁶ .................................................. B23K 5/00
[52] U.S. Cl. ...................................................... 228/8; 228/9
[58] Field of Search .................................. 228/102, 8, 9, 228/10, 12, 902

[56] References Cited

U.S. PATENT DOCUMENTS 4,121,748  10/1978  Yokokawa et al. ..................... 228/102
4,860,938  8/1989   Fillon .................................... 228/8

FOREIGN PATENT DOCUMENTS 61-126968  11/1984  Japan .
63-084761   9/1986  Japan .
7-088639A   9/1993  Japan .

Primary Examiner—Samuel M. Heinrich
Attorney, Agent, or Firm—Rabin & Champagne, P.C.

[57] ABSTRACT

A gas flow rate control device disposed between a gas burner and a combustible gas source and a burning-supporting gas source connected to the gas burner has gas flow rate setting means for setting a flow rate of the combustible gas to be supplied to the gas burner, gas ratio setting means for setting a gas ratio between the flow rate of the combustible gas and a flow rate of the burning-supporting gas to be supplied to the gas burner, a first control valve for controlling the amount of combustible gas supplied to the gas burner, a second control valve for controlling the amount of burning-supporting gas supplied to the gas burner, and control means for controlling the first and second control valves on the basis of the set flow rate of the combustible gas and the set gas ratio so that the amounts of the combustible gas and the burning-supporting gas supplied to the gas burner correspond to the flow rates set.

14 Claims, 18 Drawing Sheets

GAS FLOW RATE CONTROL DEVICE AND BRAZING DEVICE WITH FLOW RATE OF FRIST GAS AND FLOW RATE OF SECOND GAS CONTROLLED ON THE BASIS OF SET RATIO

CROSS-REFERENCE TO RELATED, COPENDING APPLICATION

Related, copending application of particular interest to the instant application is U.S. Ser. No. 08/524,444, entitled "Gas Flow Contorollar", filed Sep. 6, 1995 and assigned to the same assignee of the instant application.

BACKGROUND OF THE INVENTION

1. Field of the Invention

The present invention relates to gas flow rate control devices and brazing devices, and more particularly to an automatic brazing device for brazing, soldering, and the like, to join metal materials, ceramics, etc. using brazing wire having a melting point lower than that of the joined metals.

2. Description of the Background Art

As is disclosed in Japanese Patent Laying-Open No. 63-84761, a conventional automatic brazing device has a structure for brazing while moving a brazed material fixed in a certain position. Since it controls the amount of heating by the valve switching system, the control is made in steps even if the number of valves is increased. Furthermore, the ratio between combustible gas and burning-supporting gas is liable to become unstable due to variation in pressure of gas sources.

An automatic brazing device which takes in positional information and performs image processing for robotization is proposed in Japanese Patent Laying-Open No. 61-126968.

Also, an automatic brazing device which image-processes the temperature of a brazed part for robotization is proposed in Japanese Patent Laying-Open No. 7-88639.

In the above-described conventional system in which the heating amount is controlled by switching several passages with previously adjusted flow rates, it is necessary that an expert should repeatedly adjust the flow rate using a test piece in order to heat an object to the most suitable brazing temperature. Even after the flow rate is properly adjusted, a variation of the initial pressure of a gas source causes a change in state of flames of a burner and then the most suitable brazing temperature can not be obtained, which causes inferior brazing.

While the flow rate is controlled with a mass-flow valve in recent years, ideal reducing flame is not obtained if the flow rate ratio between combustible gas and burning-supporting gas changes, which also causes inferior finish of brazing.

Although the robotization for improving precision by image-processing positional information and temperature information does improve the brazing precision, it is so expensive that it is not suitable for automation of brazing of such mass-production parts as are positioned with jigs.

However, there have been strong demands for production of many types of conventional automatic brazing machines which achieve positioning with jigs, where it is necessary that experts set the heating amount and timing of supply of brazing wire by repeating tests on the basis of their brazing experiences. Accordingly, setting the conditions not only requires test pieces but also requires stopping operation of the automatic brazing machine in a long time.

Furthermore, there is also a social problem that such skilled workers as have experiences and ability enough to judge heating conditions and set timing for supply of brazing wire are chronically lacking due to the facts that such skilled workers are becoming older and that young workers are not willing to succeed to this technique.

SUMMARY OF THE INVENTION

Accordingly, it is an object of the present invention to provide an automatic brazing device which previously stores in a memory a control program with standardized control patterns of adjustment of gas flow rates, heating power, oscillation, etc. and stores values based on experiences of a skilled worker into a RAM by panel operation using the control program before shipment, thereby allowing a user to perform brazing like a skilled worker does, even if not a skilled worker, only by inputting conditions for joining process, even with joined parts of various materials having various thicknesses.

Another object of the present invention is to provide a gas flow rate control device which can ensure desired gas flow rates independently of variation in initial pressures of a first gas source and a second gas source by setting a first gas flow rate to be supplied and a gas ratio between the first gas flow rate and a second gas flow rate to be supplied.

Still another object of the present invention is to provide a gas flow rate control device which enables selection of a desired combustible gas flow rate and a desired gas ratio by setting heating pattern with the first gas being a combustible gas and the second gas being a burning-supporting gas.

A further object of the present invention is to provide a brazing device which makes it easy to bring a certain area of a brazed part to a desired temperature independently of variation of a gas source.

Still another object of the present invention is to provide a brazing device which enables setting of control operation for each step in brazing operation and storage thereof.

In order to achieve the objects above, a first aspect of the present invention relates to a gas flow rate control device disposed between a gas burner and a first gas source for supplying a first gas and a second gas source for supplying a second gas connected to the gas burner, which includes: gas flow rate setting means for setting a flow rate of the first gas to be supplied to the gas burner; gas ratio setting means for setting a gas ratio between the flow rate of the first gas and a flow rate of the second gas to be supplied to the gas burner; a first control valve for controlling the amount of the first gas supplied to the gas burner; a second control valve for controlling the amount of the second gas supplied to the gas burner; and control means for controlling the first and second control valves on the basis of the set flow rate of the first gas and the set gas ratio so that the amounts of the first gas and the second gas supplied to the gas burner correspond to the set flow rates.

According to a gas flow rate control device of a second aspect of the present invention, in the structure of the first aspect, with the first gas being a combustible gas and the second gas being a burning-supporting gas, the first gas flow rate setting means sets a plurality of combustible gas flow rates and the gas ratio setting means sets one or more gas ratios, and the gas flow rate control device further comprises heating pattern setting means for setting a heating pattern for an object heated by the gas burner, wherein the control means selects a desired combustible gas flow rate and a desired gas ratio from the set combustible gas flow rates and gas ratios on the basis of the set heating pattern.

According to a third aspect of the present invention, a brazing device includes: gas flow rate control means disposed between a heating torch and a combustible gas source for supplying a combustible gas and a burning-supporting gas source for supplying a burning-supporting gas connected to the heating torch; the gas flow rate control means having a gas flow rate setting portion for setting a flow rate of the combustible gas to be supplied to the heating torch, a gas ratio setting portion for setting a gas ratio between the flow rate of the combustible gas and a flow rate of the burning-supporting gas to be supplied to the heating torch, a first control valve for controlling the amount of the combustible gas supplied to the heating torch, a second control valve for controlling the amount of the burning-supporting gas supplied to the heating torch, and a control portion for controlling the first and second control valves on the basis of the combustible gas flow rate set and the gas ratio set so that the amounts of the combustible gas and the burning-supporting gas supplied to the heating torch correspond to the flow rates set, and further includes driving means for driving the heating torch; and control means for controlling the driving means so that the heating torch comes closer to a brazed part to bring a certain area of the brazed part to a desired temperature before brazing.

According to a brazing device in a fourth aspect of the present invention, in the structure of the third aspect, the brazing device further includes setting means capable of setting control operation in each step in brazing operation, and storing means for storing the control operation set.

As has been described above, according to the gas flow rate control device of the first aspect, only setting a flow rate of the first gas and a gas ratio between the flow rate of the first gas and the flow rate of the second gas allows the first and second control valves to be controlled so that the amounts of the first gas and the second gas supplied to the gas burner correspond to the flow rates set.

Accordingly, it is possible to supply desired flow rates of first gas and second gas independently of variation in initial pressures of the first gas source and the second gas source, providing a reliable gas flow rate control device.

According to the gas flow rate control device of the second aspect of the present invention, in addition to the effect of the first aspect, setting heating pattern according to shape, material, etc. of a heated object allows a flow rate of the combustible gas and a gas ratio corresponding to this heating pattern to be selected. This enables a user to achieve effective gas supply only by setting the heating pattern suitable for the heated object.

According to the brazing device of the third aspect of the present invention, only by setting a flow rate of the combustible gas to be supplied to the heating torch and a gas ratio between the combustible gas flow rate and the burning-supporting gas flow rate, the combustible gas and burning-supporting gas can be always supplied at the set flow rates independently of variation in initial pressures of the combustible gas source and the burning-supporting gas source. Then the heating torch is controlled on the basis of the stable supply of gases so that the certain area of the brazed part attains a desired temperature, which effectively provides stable heating to the brazed part.

According to the brazing device of the fourth aspect of the present invention, in addition to the effect of the third aspect, it is possible to set control operation in each step in brazing operation and to store the contents. Therefore, brazed parts with stable quality can be easily obtained in repeated brazing operations.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
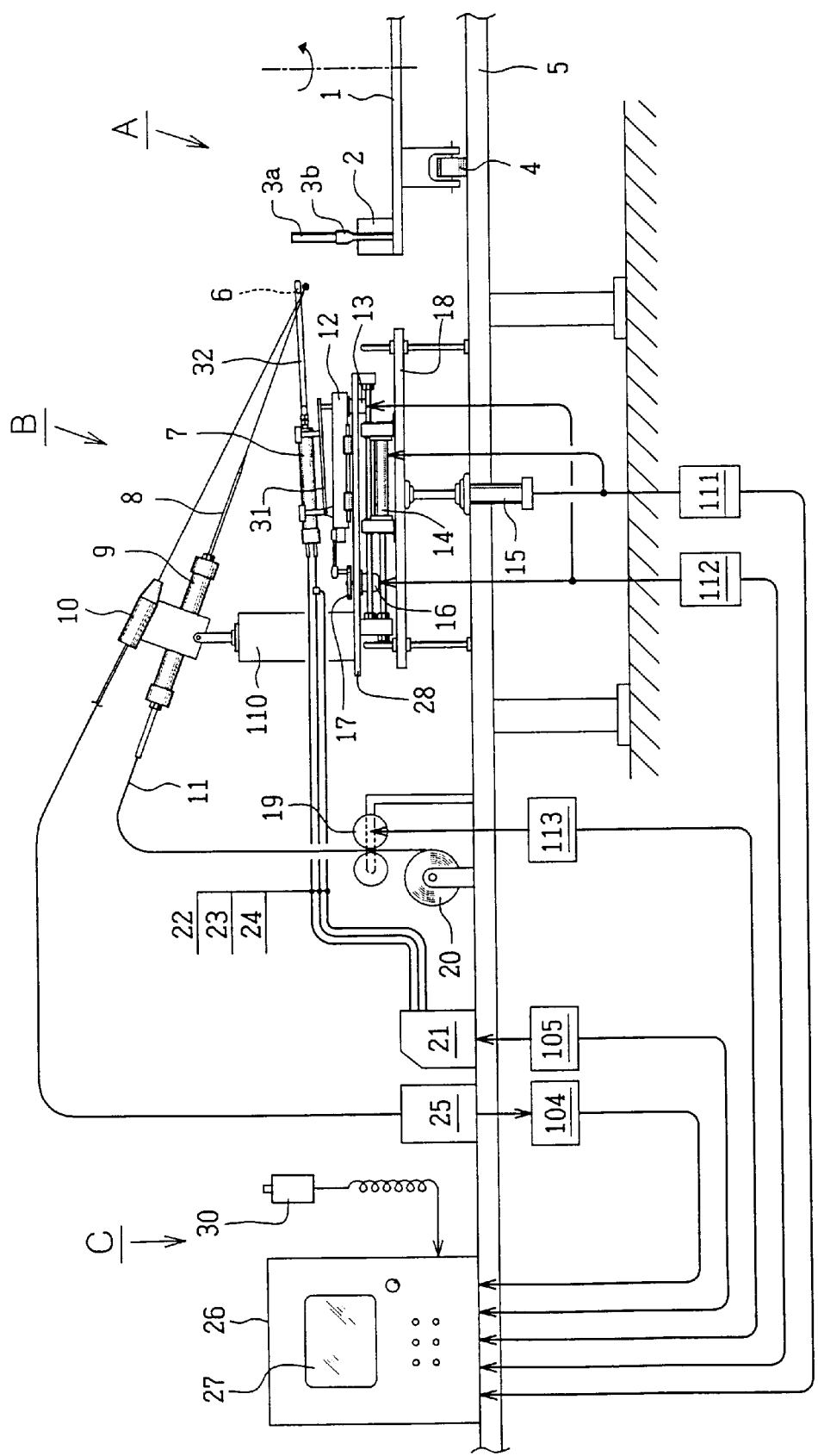
FIG. 1 is a diagram showing the external structure of an automatic brazing device according to an embodiment of the present invention.
Figure 2:
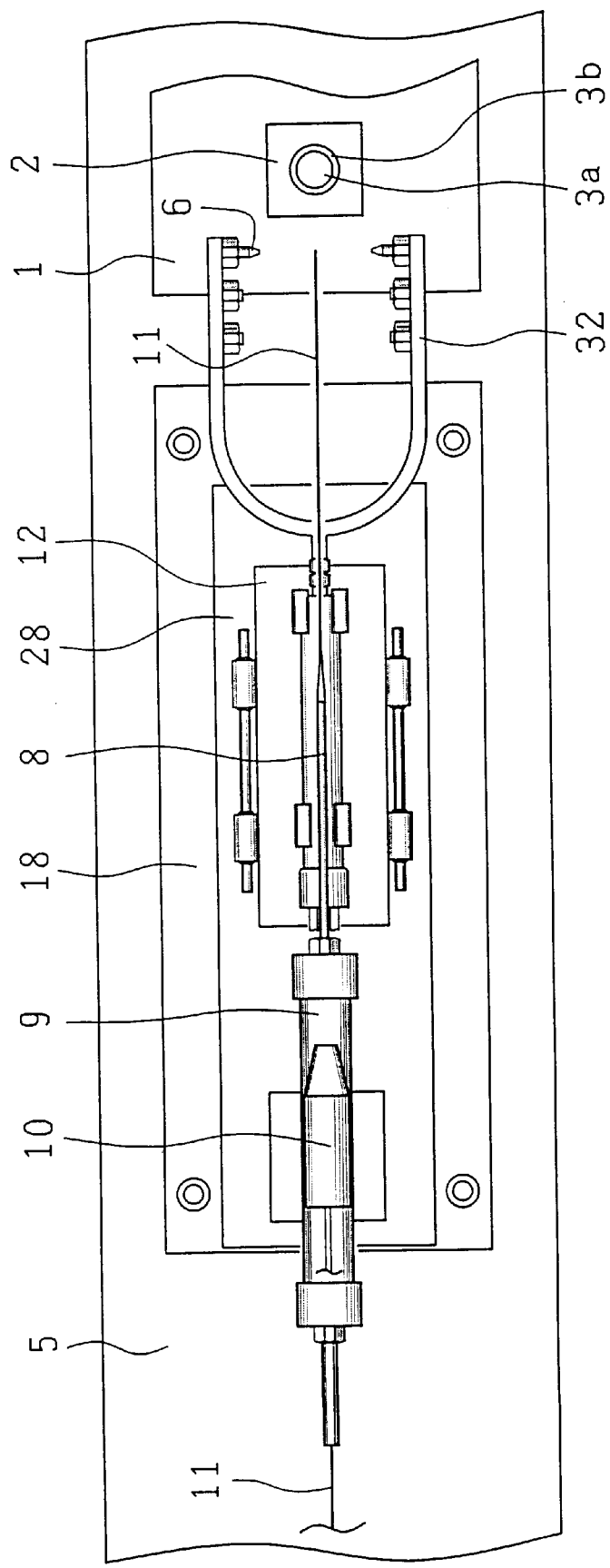
FIG. 2 is a plan showing the details of the heating and brazing wire supply unit B of FIG. 1.
Figure 3:
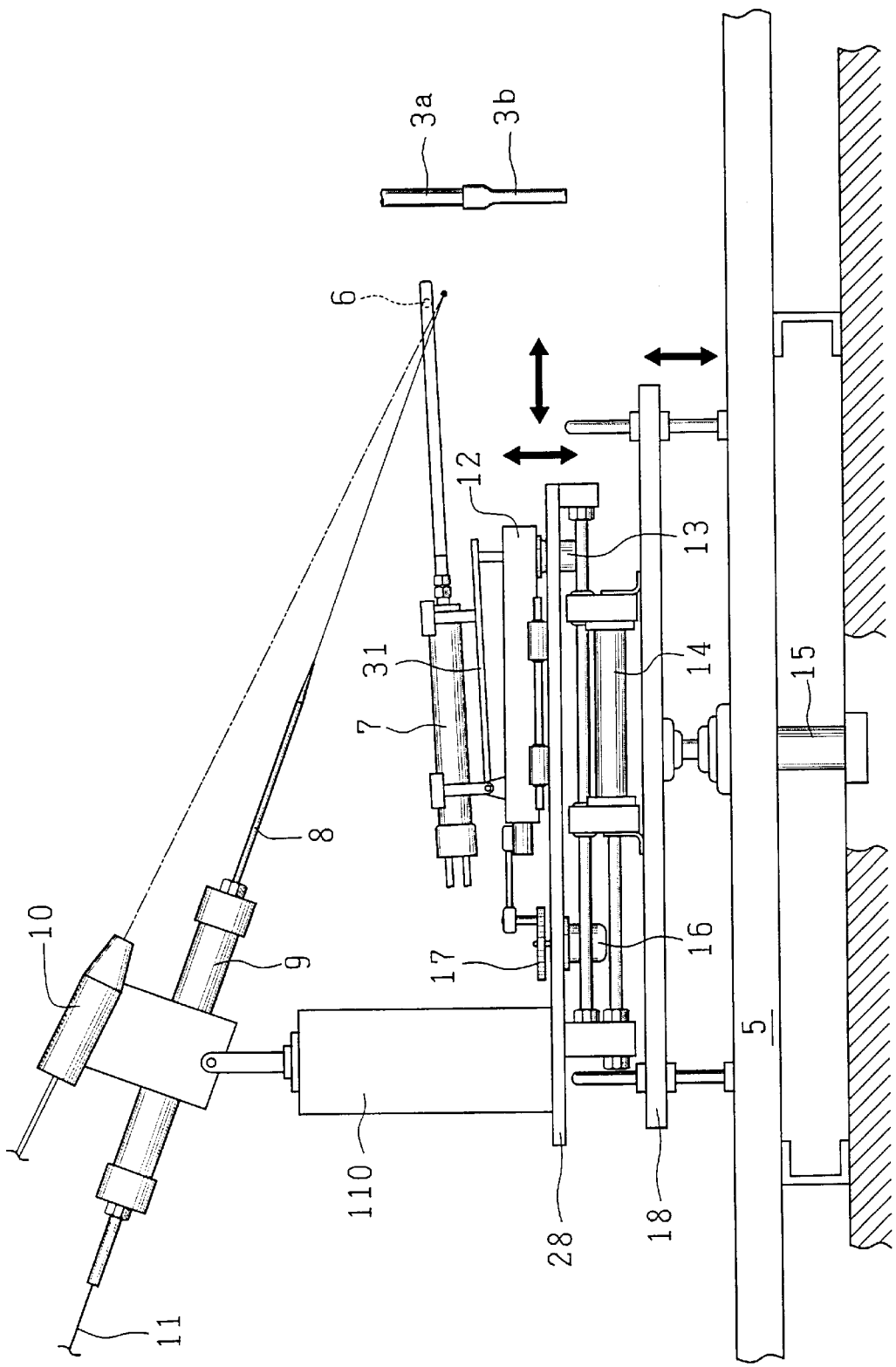
FIG. 3 is a side view showing the details of the heating and brazing wire supply unit B of FIG. 1.
Figure 4:
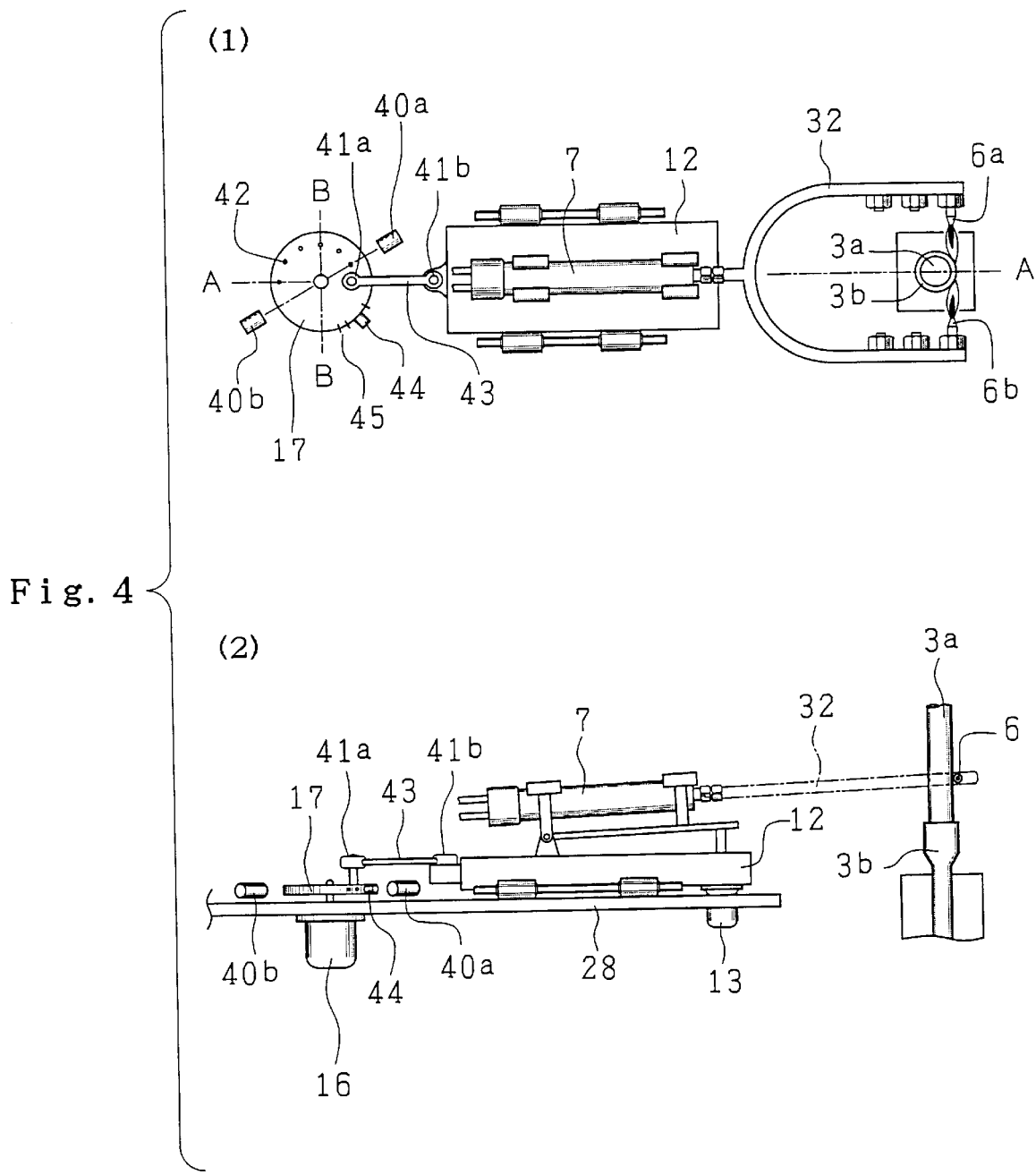
FIG. 4 is a diagram for use in explaining the operation of the oscillation rotation plate 17 of FIG. 1.
Figure 5:
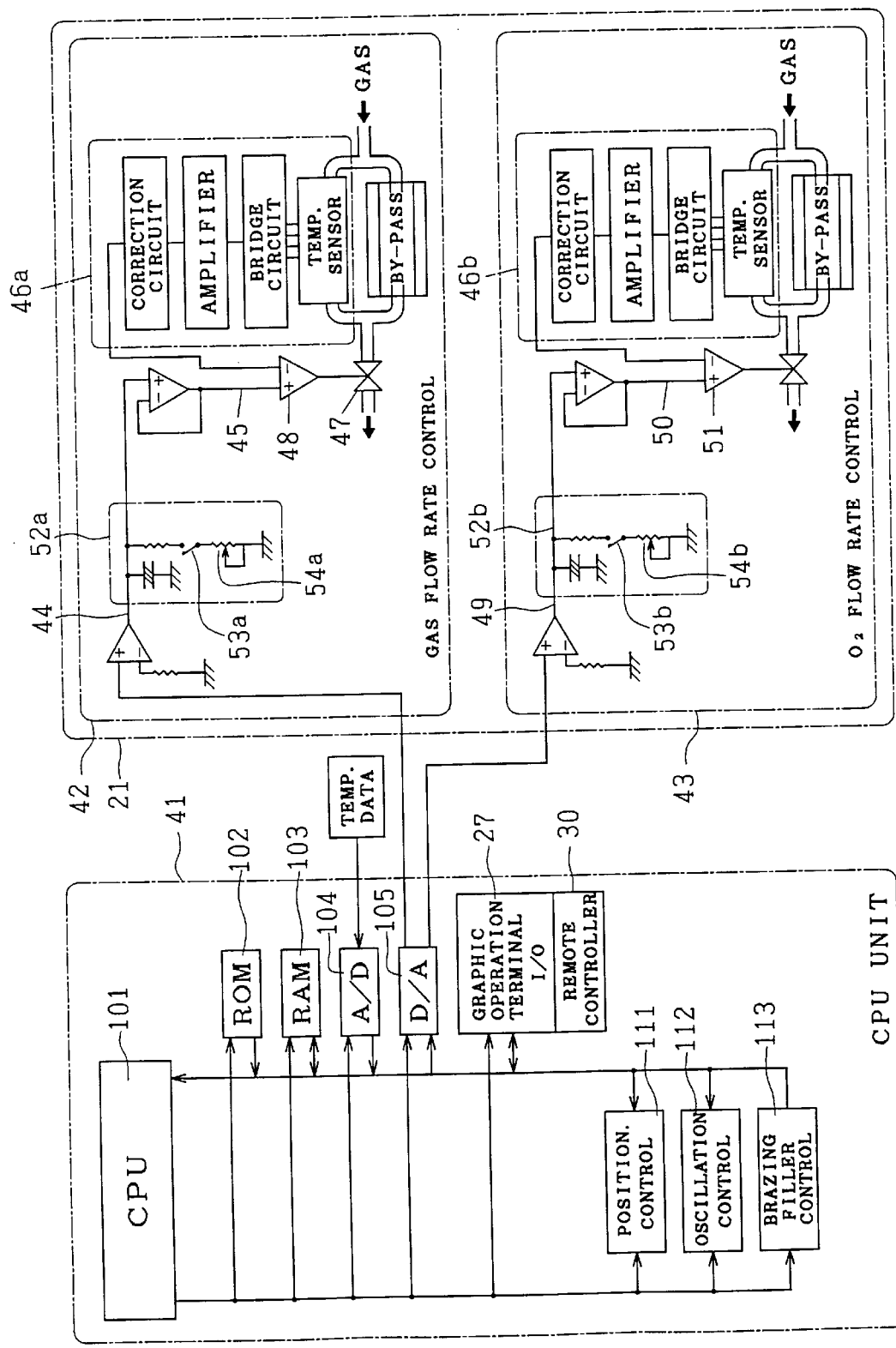
FIG. 5 is a block diagram showing specific contents of the gas flow rate control device 21 and the control panel 26 of FIG. 1.

FIG. 1 is a diagram showing schematic structure of an automatic brazing device according to an embodiment of the present invention, FIG. 2 is an enlarged plan of the heating and brazing wire supply unit B, FIG. 3 is a side view of the unit shown on FIG. 2, FIG. 4 is a diagram for describing operation of the burner oscillation table of FIG. 1, and FIG. 5 is a diagram showing a control circuit for controlling the automatic brazing device of FIG. 1.

Referring to FIG. 1 to FIG. 4, the automatic brazing device generally includes the brazing jig unit A, the heating and brazing wire supply unit B and the control equipment C. The relative positions of the brazing jig unit A and the heating and brazing wire supply unit B are fixed on the brazing device fixing table 5.

The brazing jig unit A includes an index table 1, a plurality of jigs 2 for fixing joined materials 3a, 3b on the index table 1, and a roller 4 for supporting the index table 1. The index table 1 having the roller 4 rotates on the brazing device fixing table 5 to fix the joined pipe clamp jig 2 in a desired brazing position.

In the heating and brazing wire supply unit B, a cylinder 15 for driving a brazing unit table 18 up and down is attached to the brazing device fixing table 5, a brazing unit moving cylinder 14 is fixed to the brazing unit table 18, and a oscillation motor 16 is fixed to a brazing unit moving table 28, where the moving table 28 and a oscillation table 12 on the table 28 communicate with each other through a oscillation rotation plate 17. The oscillation table 12, to which a burner up-down cylinder 13 is fixed, moves up and down a fixing metal part 31 of a gas mixing chamber 7. At the end of the gas mixing chamber 7, each end of a forked gas nozzle 32 allows attachment of several heating torches 6. In this embodiment, two heating torches 6a, 6b are attached thereto. A stand 110 is provided in the rear part of the brazing unit moving table 28, to which a nozzle driving cylinder 9 and a radiation thermometer 10 are attached, which are fixed to aim at the center of the heating flames of the two torches 6a, 6b.

The brazing wire nozzle 8 is advanced by the nozzle driving cylinder 9 to get closer to the joined part 3a, 3b, and then the brazing wire 11 is drawn out for a set amount by the brazing wire supply motor 19 from the brazing wire reel 20.

FIG. 4 is a diagram showing the details of the oscillation rotation plate 17 shown in FIG. 1 and FIG. 3 and its vicinities, wherein (1) of FIG. 4 is its plan and (2) of FIG. 4 is its side view.

Referring to the figures, the burner oscillation table 12 to which the mixing chamber 7 is attached is installed movably in the direction of the axis A—A on the brazing wire unit moving table 28. The oscillation motor 16 is attached to the lower surface of the brazing unit moving table 28, whose shaft passes through the brazing unit moving table 28 to protrude over its upper surface, to which the oscillation motor rotation plate 17 is attached. The rear end of the burner oscillation table 12 and the oscillation rotation plate 17 are coupled to each other by the crank 43, where one end of the crank 43 is rotatably coupled to the burner oscillation table 12 by the pin 41b and the other end of the crank 43 is rotatably coupled to the oscillation rotation plate 17 by the pin 41a. The oscillation rotation plate 17 has a plurality of fitting holes for the pin 41a formed at distances corresponding to the radius of brazed parts 3a, 3b from its center of rotation. Furthermore, a pair of sensors 40a, 40b are attached around the oscillation rotation plate 17 above the brazing unit moving table 28 in positions opposite about its center of rotation. A sensor knob 44 is attached to the side of the oscillation rotation plate 17. When the sensor knob 44 passes the line connecting the sensors 40a, 40b, the rotating position of the oscillation rotation plate 17 is detected. A plurality of fitting holes 45 for attaching the sensor knob 44 are formed on the side of the oscillation rotation plate 17.

Next, operation of the burner oscillation table will be described.

When oscillation operation by the heating torches 6a, 6b to the brazed parts 3a, 3b is instructed, then the oscillation motor 16 is driven and the oscillation rotation plate 17 rotates. The rotating motion of the oscillation rotation plate 17 is converted into linear motion of the burner oscillation table 12 in the direction A/A through the crank 43 and the pins 41a, 41b. That is to say, every time the oscillation rotation plate 17 makes one rotation, the burner oscillation table 12, i.e., the pair of heating torches 6a, 6b attached to the ends of the gas nozzles 32 reciprocate once around the peripheral surface of the joined parts 3a, 3b in the A/A direction. This way, since the rotary motion of the oscillation rotation plate 17 is converted into reciprocating motion of the heating torches 6a, 6b, the pin 41a is attached so that the distance between its position and the center position of the oscillation rotation plate 17 corresponds to half of the reciprocating distance of the torches 6a, 6b. That is, in this embodiment, the fitting hole 42 for the pin 41a is selected so that it corresponds to half of the diameter of the joined pipes 3a, 3b. While the rotating position of the oscillation rotation plate 17 corresponds to the position of the torches 6a, 6b as stated above, a time lag generally occurs before a command based on the detected rotating position of the oscillation rotation plate 17, e.g., a change of the gas flow rate, reaches the position of the torches 6a, 6b. Accordingly, to provide a solution to such a time lag, the location of the sensor knob 44 attached to the fitting hole 45 is selected to control the detection timing by the sensors 40a, 40b.

The control equipment C for the devices includes a gas flow rate control device 21 for controlling the gas flow rates, a temperature measuring device 25, a control panel 26 incorporating a graphic operation terminal 27 for both operation and display and input/output portions of a CPU 101, which serves as a central element of the electronic control shown in FIG. 5, and a remote controller 30.

Referring to FIG. 5, the structure for controlling the gas flow rates of the automatic brazing device according to the embodiment includes a CPU unit 41 including the CPU 101 as its central element, a combustible gas flow rate control device 42 for controlling the flow rate of combustible gas, and a burning-supporting gas flow rate control device 43 for controlling the flow rate of burning-supporting gas. The CPU unit 41 includes a ROM 102 in which various control programs used in the CPU 101 are stored, a RAM 103 in which set information is stored when operations are set, a temperature control portion (A/D converter circuit) 104 for converting temperature data (analogue data) inputted from the radiation thermometer 10 into digital data, a burner control portion (D/A converter circuit) 105 for outputting control signals to the combustible gas flow rate control device 42 and the burning-supporting gas flow rate control device 43, a positioning control portion 111 for controlling the position of the heating torches 6 with respect to the brazed parts, a oscillation control portion 112 for controlling the oscillation operation of the heating torches to the brazed parts, a brazing wire control portion 113 for controlling the operation of drawing out the brazing wire, a graphic operation terminal 27 for inputting or displaying various set conditions, and a remote controller 30 used when setting conditions while visually monitoring the condition of the brazing, which are interconnected through control buses and data buses.

Setting means for the flow rates and the gas ratio corresponds to the operation in the graphic operation terminal 27 of the control panel 26, set contents of which are stored in the memory (RAM 103). A flow rate setting signal for combustible gas is D/A converted in the D/A circuit 105 on the basis of a control instruction from the CPU 101, amplified in an operational amplifier, and becomes a desired voltage at the node 44. Subsequently, a combustible gas flow rate setting reference voltage amplified in a voltage follower circuit and brought to a desired value at the node 45 is inputted to one input of the comparator 48. As the other comparison input to the comparator 48, a detection output of flow rate detecting means 46a about the amount of passage of the combustible gas is provided. The comparison output portion of the comparator 48 is connected to a control valve 47. In the comparator 48, the two signals are compared and such a control signal that their difference becomes 0 is outputted to the control valve 47. The flow rate detecting means 46a includes a temperature sensor provided on the upstream of the control valve 47 and the detecting circuit. The temperature sensor detects a temperature difference in proportion to the mass flow rate occurring between the upstream and the downstream of the sensor when the combustible gas flows and its detection signal is linearly corrected in the detection circuit and outputted to the comparator 48. In this embodiment, an electromagnetic control valve is used as the control valve 47, which changes its opening in proportion to the control signal of the comparator 48 to control the gas flow rate.

The flow rate of the burning-supporting gas ($O_2$) is set by operating the terminal 27. That is to say, when an $O_2$/combustible gas flow rate ratio is inputted to the memory (RAM 103) through the graphic operation terminal 27, the CPU 101 calculates the burning-supporting gas flow rate on the basis of the control program stored in the ROM 102 and the value is D/A converted in the D/A circuit 105. The converted signal is amplified in the operational amplifier and a desired voltage is generated at the node 49. A burning-supporting gas flow rate setting reference voltage, which is further amplified in the voltage follower circuit and brought to a desired value at the node 50, is inputted to one input of the comparator 51. In the flow rate detecting means 46b, the flow rate is controlled by the same means as that for the combustible gas described above. This way, when the flow rate of the combustible gas and the gas ratio are inputted through the graphic operation terminal 27, a voltage signal corresponding to the combustible gas flow rate and a voltage signal corresponding to the burning-supporting gas flow rate calculated on the basis of the inputted ratio are respectively inputted to the combustible gas flow rate control device 42 and the burning-supporting gas flow rate control device 43 through the D/A circuit 105. Accordingly, only inputting the combustible gas flow rate and the gas ratio allows supply of combustible gas and burning-supporting gas at desired flow rates and a flow rate ratio to the heating torches, independently of variation in gas pressures of gas sources of the combustible gas and the burning-supporting gas, which enables stable heating processing to brazed parts. This method of controlling the gas flow rate is described in detail in "Gas Flow Controller" filed on Sep. 6, 1995.

The gas flow rate setting reference voltage circuits to which the D/A converted data are inputted include ramping circuits 52a, 52b respectively for the combustible gas flow rate control device 42 and the burning-supporting gas flow rate control device 43. The ramping circuits 52a, 52b each include a time constant circuit having an integrating capacitor and a ramping time setting volume 54a, 54b connected in parallel to the capacitor through an operation/release switch 53a, 53b for the ramping time setting volume, which control the slope of the two reference voltages when rising and falling by adjusting the ramping time set volumes 54a, 54b.

That is to say, it makes smooth the change between strong flame and weak flame with different gas flow rates so that the flame gradually becomes larger or smaller instead of suddenly becoming larger or smaller. At this time, it is possible to select whether to effect the ramping control or not by operating the operation/release switches 53a, 53b of the ramping time setting volumes.

On the above-described index table 1, several joined pipe clamping jigs are detachably arranged in certain positions on the circumference and a work detection sensor (not shown) is attached thereto for detecting yes/no of the joined pipes 3a, 3b in a station (not shown) in front of the brazing position, whose detection output is automatically inputted to the CPU 101.

FIG. 6 to FIG. 13 show examples of screen displays and inputs in the graphic operation terminal 27 incorporated in the control panel 26.

Figure 6:
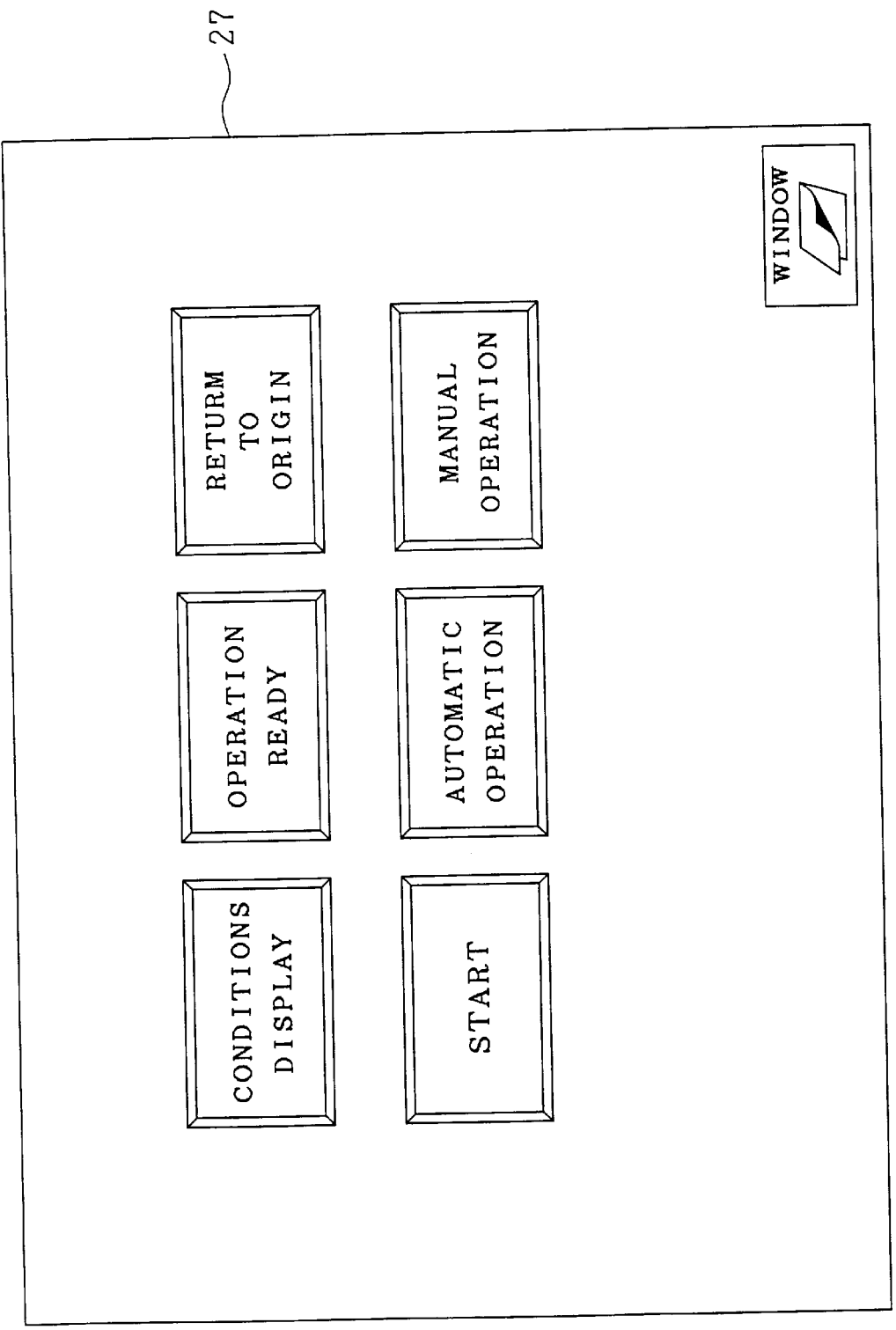
FIG. 6 shows an example of an initial input display of the graphic operation terminal 27 of FIG. 1.

Referring to FIG. 6, when the running power-source is turned on and "OPERATION READY" is touch-operated, then current is applied to the control equipment, and when "RETURN TO ORIGIN" is touch-operated, then the reference point of start of the program is determined. Touch-operating any of "MANUAL OPERATION", "AUTOMATIC OPERATION", "CONDITION DISPLAY" and "START" permits selection of various operations. The display then changes to those shown in FIG. 7 to FIG. 13 according to the operating procedure to enable desired inputs.

FIG. 15 to FIG. 18 are flow charts showing the procedure of teaching and automatic operation.

First, referring to FIG. 15, the teaching preparation flow will be described in the order of the screen operation in the graphic operation terminal.

Figure 7:
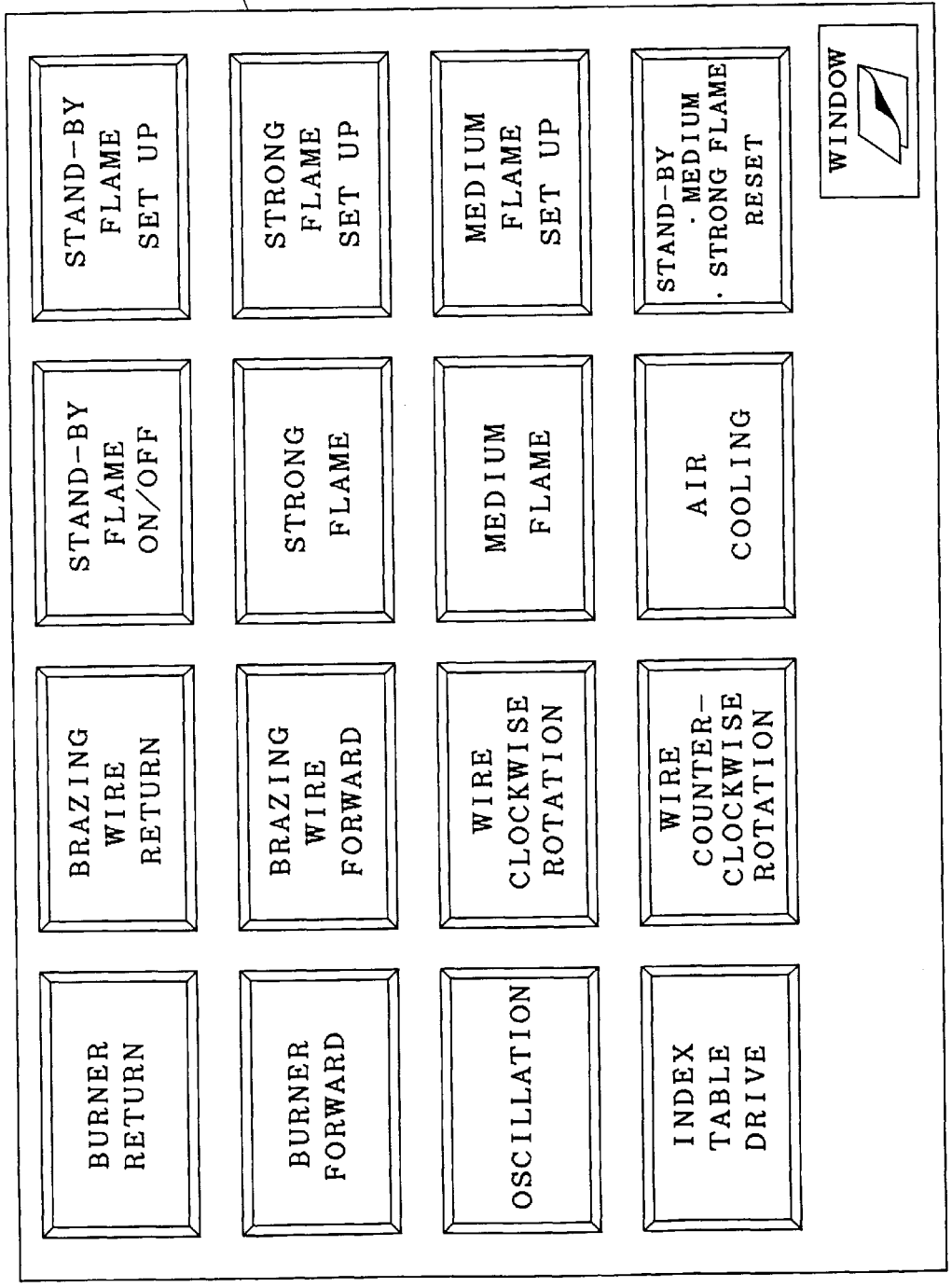
FIG. 7 shows an input display switched by screen operation of FIG. 6.

When "MANUAL OPERATION" in the display of FIG. 6 is touch-operated to adjust the device parts of the brazing equipment for the joined parts (S1), then the display of FIG. 7 appears. The joined pipes 3a, 3b are installed to the joined pipe clamp jigs on the index table 1 and then set into the brazing position by turning "INDEX TABLE" (not shown) on. It is confirmed that the crank pin 41a shown in FIG. 4 is set in the position corresponding to the diameter of the joined pipe and then "OSCILLATION" is touch-operated. Then with the oscillation motor 16 slightly moving, the crank pin 41a and the end of the crank 43 are stopped on the line A—A or on the line B—B (S2).

Next, "INDEX TABLE DRIVE" is touch-operated to control the height of the center of flames of the pair of heating torches 6a, 6b to the heated position of the joined material with the brazing unit up-down cylinder 15 slightly moving (S3). Next, "BURNER FORWARD" is touch-operated to advance the brazing unit moving table 28, which is finely adjusted by graphic operation terminal operation and positioned so that the center of heating flames is located in the position of the joined material 3a shown in FIG. 4 (when the pin 41a is adjusted to the line A—A) or located in the center of the joined material 3a (when the pin 41a is adjusted to the line B—B) (S4). In this condition, "BURNER UP-DOWN CYLINDER" (not shown) is touch-operated and it is checked whether the positions of the heating to the brazing wire supplied portion and the heating to the overlapped part of the joined materials are properly established (S6).

Next, "BRAZING WIRE FORWARD" is touch-operated to drive the nozzle drive cylinder 9 to move the brazing wire nozzle 8 closer to the brazing wire supplied position of the joined material (S7), and then "WIRE CLOCKWISE ROTATION" is touch-operated to draw out the brazing wire and then it is checked whether the drawing direction is directed to the center of the joined material or to the brazing wire supplied position (S9). Then, "WIRE COUNTER-CLOCKWISE ROTATION", "WIRE RETURN" and "BURNER RETURN" are touch-operated (S10–S12) to complete the adjustment of the machine.

If the end of the wire is not positioned to the brazing wire supplied position in the Step (S9), operations of the wire counterclockwise rotation (S13) and the cylinder positioning and the nozzle positioning (S14) are performed and then the nozzle end positioning (S7) and the positioning of the drawn wire by wire clockwise rotation (S8) are repeated to adjust the end of the wire to the brazing wire supplied position.

When the heated position and the brazing wire supplied position are determined by the above operations, "CONFIRM" (not shown) is touch-operated and then the position setting information is stored in the RAM 103 of FIG. 5. Subsequently, gas flow rates are set and standard pattern stored in the ROM 102 is selected, and then manual brazing or sample production can be manually performed in the order of "MANUAL OPERATION"→"START"→"STAND-BY FLAME" ON→"BURNER FORWARD"→"OSCILLATION"→"BRAZING WIRE FORWARD"→"WIRE CLOCKWISE ROTATION"→"WIRE COUNTERCLOCKWISE ROTATION"→"WIRE RETURN"→"BURNER RETURN"→"STAND-BY FLAME" OFF.

Figure 16:
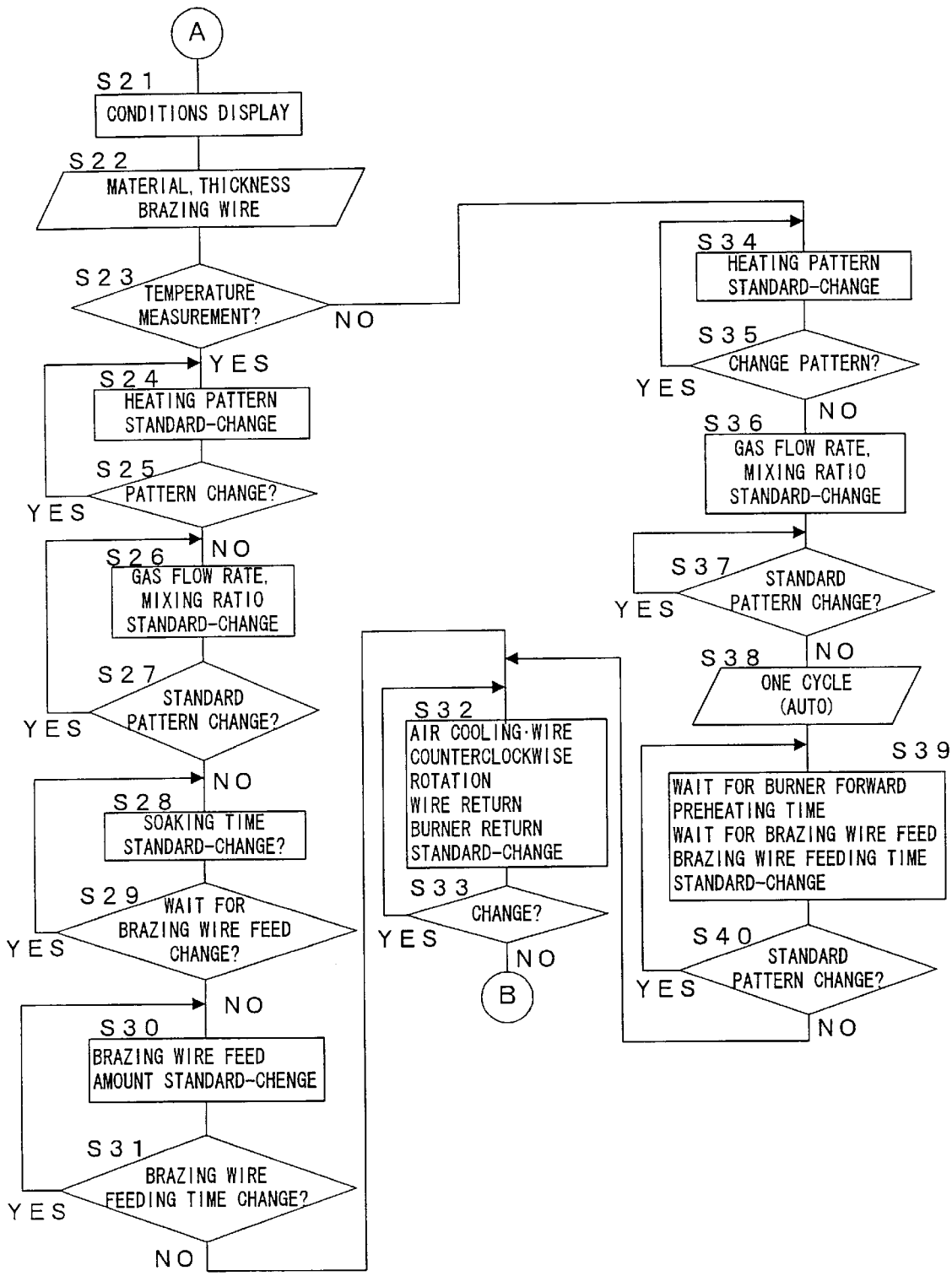
FIG. 16 is a flow chart showing specific contents for setting conditions in the program control in the automatic brazing device of FIG. 1.

FIG. 16 is a flow chart showing teaching processing for brazing conditions in the program aspect.

Figure 8:
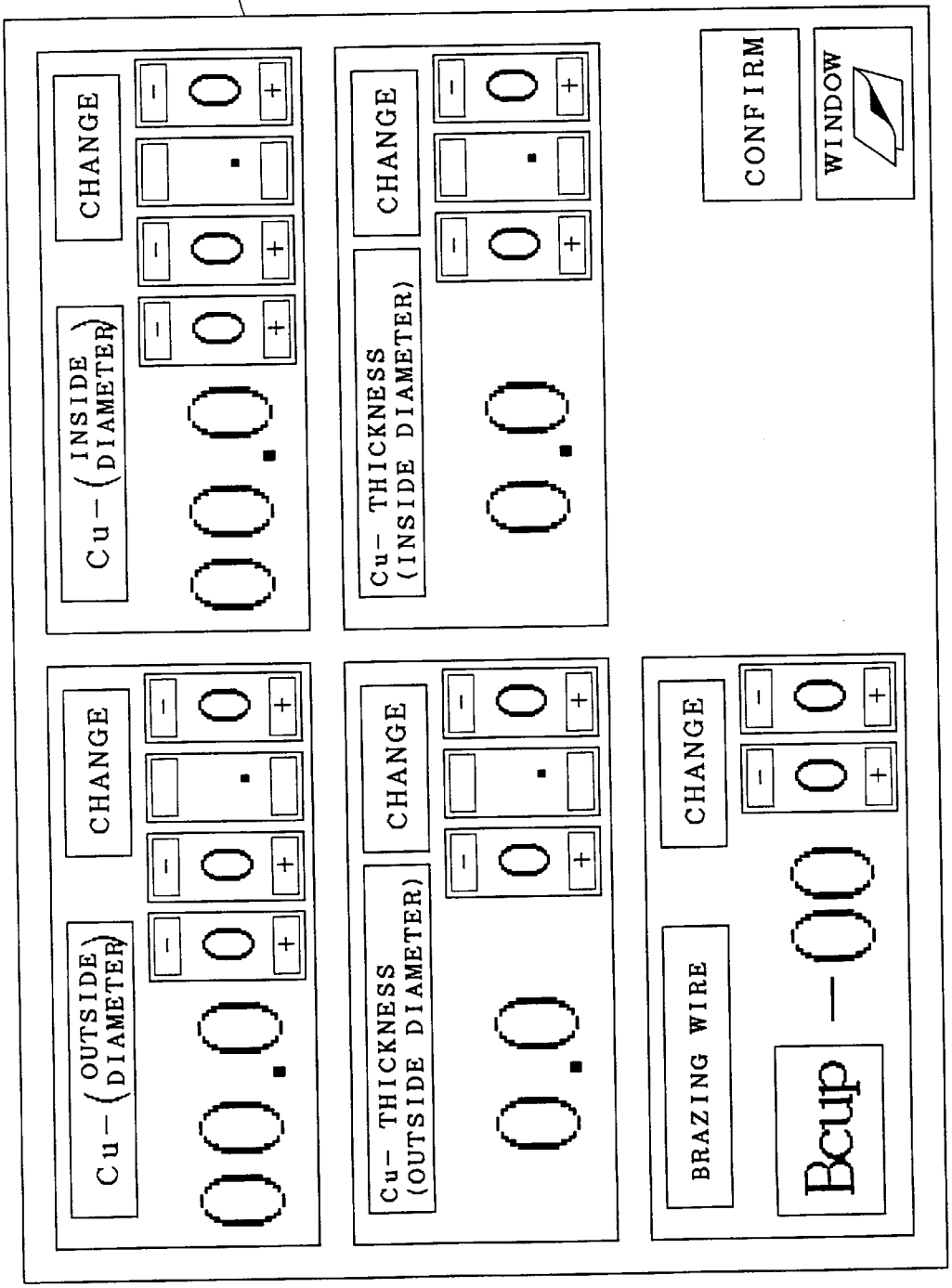
FIG. 8 shows a display for inputting conditions for brazed material and brazing wire in the graphic operation terminal 27 of FIG. 1.

When "CONDITIONS DISPLAY" is touch-operated in the screen of FIG. 6, the input display for use conditions of joined materials shown in FIG. 8 is displayed. This screen is displayed for each combination of the joined materials 3a, 3b. This example of display shows brazing of a copper pipe and a copper pipe. Touch-operating "WINDOW" sequentially changes the displayed combination of joined materials. For example, it is possible to sequentially select displayed combinations of joined materials, such as Cu—Cu, Cu—Fe, Cu—SUS, Fe—Fe, Fe—SUS, SUS—SUS, etc. As to the brazing wire, repeating touch operation in that frame causes displays to sequentially appear, such as BCup, BAg, BCuZn, etc. After selecting a combination to be joined, numerals of 0 to 9 are inputted as respective pipe diameters, plate thicknesses, and a JIS number of the brazing wire by touch-operating "CHANGE" and repeating touch-operation to "+" or "−". After the changing operation is finished, "CONFIRM" is touch-operated and the display then changes to the next input screen.

Figure 9:
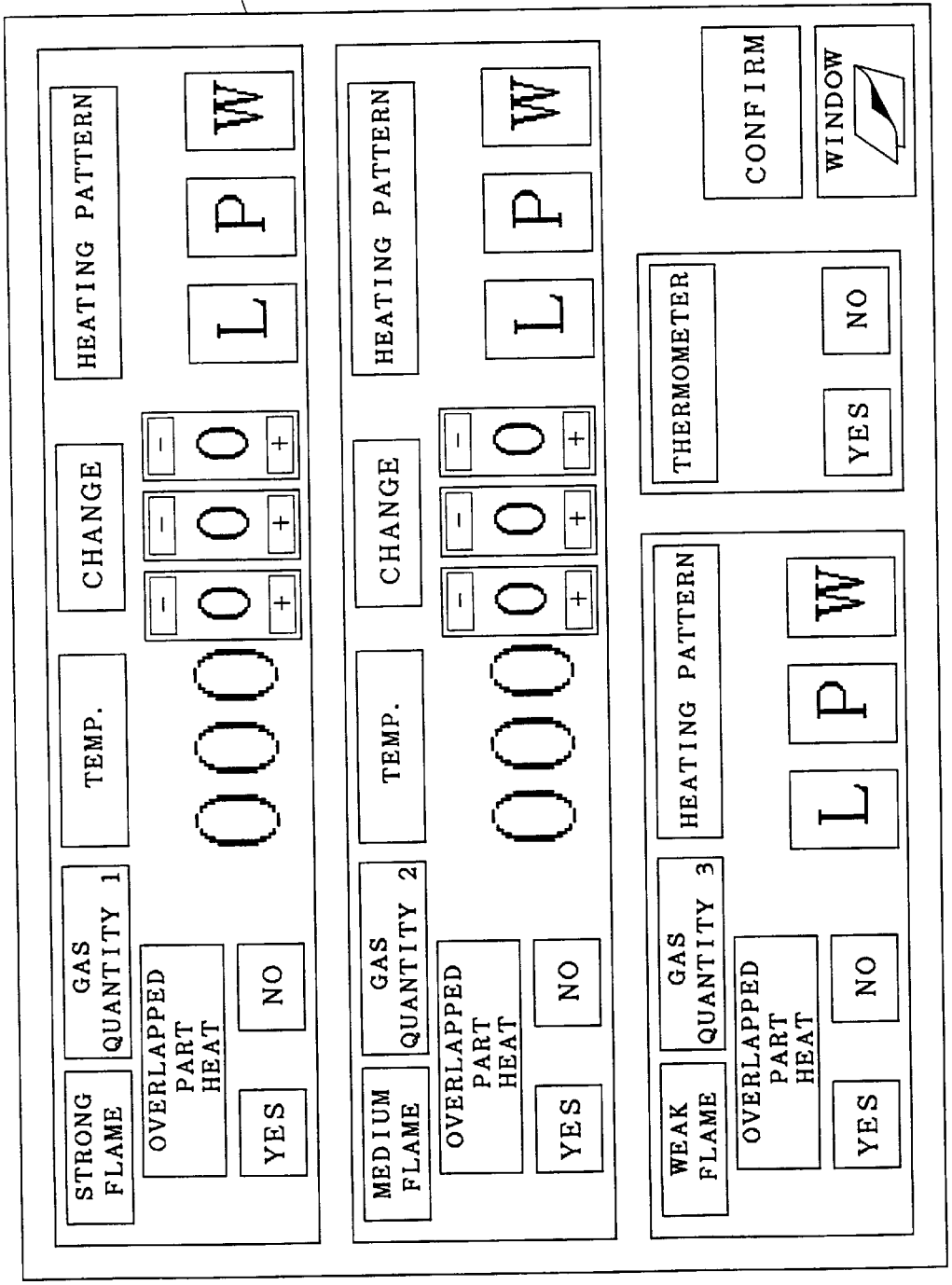
FIG. 9 shows a display for setting heating conditions with burner flames of the heating torch in the graphic operation terminal 27 of FIG. 1.

When the joined material is selected, then the standard heating pattern previously stored in the ROM 102 of the CPU unit 41 shown in FIG. 5 is displayed in the screen shown in FIG. 9. Even when the brazing device used has no radiation thermometer, or when it has one but its temperature data is not used, brazing processing can be done. Hence, it is possible to set "YES" or "NO" of the thermometer.

While a flow for teaching with temperature measurement "YES" will be described referring to FIG. 16, a flow with temperature measurement "NO" is basically the same.

Figure 14A:
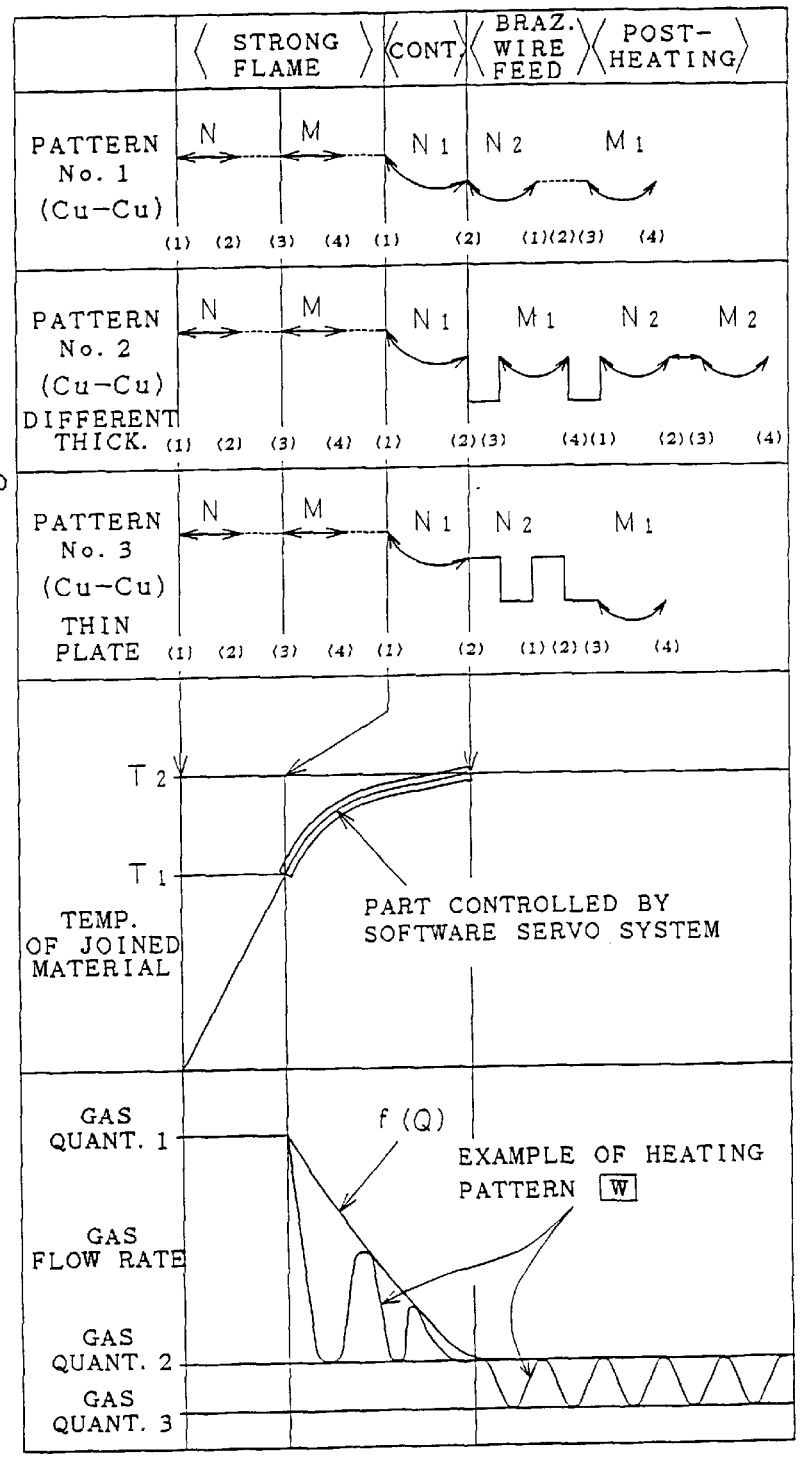
FIGS. 14a–14c are diagrams showing specific examples of heating patterns in each point of a brazed material.
Figure 14B:
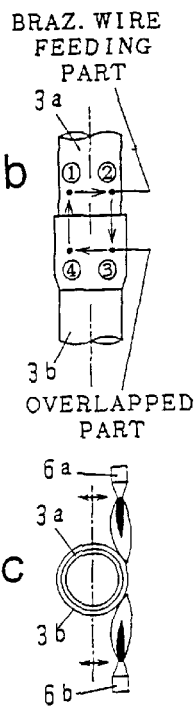
Figure 14C:
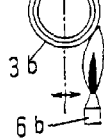

Now, FIGS. 14a–14c are diagrams for describing the setting of the heating condition pattern. A moving locus of the heating flame passes the points (1)-(2), (2)→(3), (3)-(4), (4)→(1) on the joined material. As shown in FIG. 4, this operation is achieved by rotating the oscillation rotation plate 17 by rotation of the oscillation motor 16 to repeatedly move the burner oscillation table 12 forward and backward through the crank 43. At this time, the end of the burner flame forms the moving locus of points (1)-(2), (3)-(4) shown in FIGS. 14a–14c. Next, up-and-down movement of the gas mixing chamber fixing metal part 31 caused by the movement of the burner up-down cylinder 13 moves the gas nozzle 32 up and down so that the end of the burner flame can form the moving locus of the points (2)→(3), (4)→(1) in FIGS. 14a–14c.

The pattern No. 1 shown in FIG. 14a shows an example in which the joined materials are Cu—Cu pipes. In this example, the strong flame is rocked by the forward motion of the brazing unit table 28 and the rotation of the oscillation motor 16. The portion (1)-(2) is heated N times, and then the strong flame is moved as (2)→(3) to the overlapped part by movement of the burner up-down cylinder 13. Subsequently, (3)-(4) is heated M times, and the burner up-down cylinder 13 is raised to move the strong flame as (4)→(1).

Between when the temperature of the joined material reaches $T_1$ and when it reaches the target temperature $T_2$, the control is performed using the above-described gas flow rate control device 21 which can control gas flow rates with the mixing ratio between the burning-supporting gas and the combustible gas kept constant. Specifically, this flow rate control is done using the software servo system in which the following expression stored in the ROM 102 is operated, which performs the heating control with oscillation of $N_1$ times.

$$f(Q) = Q_1 - (Q_1 - Q_2) \times \beta^{\frac{T_2 - t}{\theta}}$$

Where,
$T_2$=brazing wire liquid-phase temperature +50° C.,
$T_1 = T_2 - \alpha$,
$\alpha$: servo heating temperature range,
t=measured temperature,
$\theta$=multiplier,
$Q_1$=gas set quantity 1,
$Q_2$=gas set quantity 2,
$Q_3$=gas set quantity 3, and
$\beta$: coefficient of heat transfer rate,
Furthermore, the required amount of oxygen is given as:

$$f(Q') = \epsilon f(Q)$$

Where,
Q=flow rate of combustible gas,
Q'=flow rate of burning-supporting gas, and
$\epsilon$=ratio of burning-supporting gas/combustible gas.
The following shows standard servo constant strings with LPG flame.

|  | $\alpha$ | $\theta$ | $\beta$ |
|---|---|---|---|
| Cu | 100 | 10 | 0.77 |
| Fe | 150 | 15 | 0.80 |
| Sus | 200 | 20 | 0.93 |

The values of the constants vary also according to the heating power which depends on the kind of the gas used and the size of the heating torch.

The above flame control conditions are inputted by operation in the graphic operation terminal of FIG. 9.

First, "YES" or "NO" of heating to the overlapped part with "STRONG FLAME" is selected to determine the heating pattern. While the temperature $T_1$ at which the software control is started is given as $T_1 = T_2 - \alpha$, it is specifically set in the range from 100° to 200° C. as a temperature determined by considering the heat conductivity of the material on the basis of the temperature given against liquid phase temperature of brazing wire +50° C. As to the heating pattern, "L" is touch-operated when the heating power of the flame is not changed. When it is desired to change the heating power of the flame on the basis of the distance between the joined material and the heating torch, the pulse "P" or the wave form "W" is touch-operated to keep soaking state of the joined material. At this time, the piping distance between the output portion of the flow rate control device and the nozzle causes a time lag in flame control. Considering the time lag, the position of the sensor knob 44 shown in FIG. 4 is set so that the flame becomes strong at the points (1), (2), (3) and (4) of the joined material.

Next, "YES" or "NO" of heating with "MEDIUM FLAME" to the overlapped part is selected. As the set temperature $T_2$, a standard temperature is set depending on the kind of the brazing wire, as $T_2$=liquid-phase temperature of brazing wire +50° C. The heating pattern is selected as "L", "P" or "W" in the same way as stated above.

The heating with "WEAK FLAME" is made to keep the soaking state when the brazing wire is supplied and to promote penetration of the molten brazing wire to the overlapped part of the joined materials 3a, 3b, as shown in FIGS. 14b and 14c, by the capillary phenomenon after the supply of brazing wire. It is selected as "YES" or "NO" of heating to the overlapped part. In the same way as stated above, the heating pattern is selected out of "L", "P" and "W" (S24, S25). The "CONFIRM" is touch-operated and then the screen of the graphic operation terminal moves to the next display.

Figure 10:
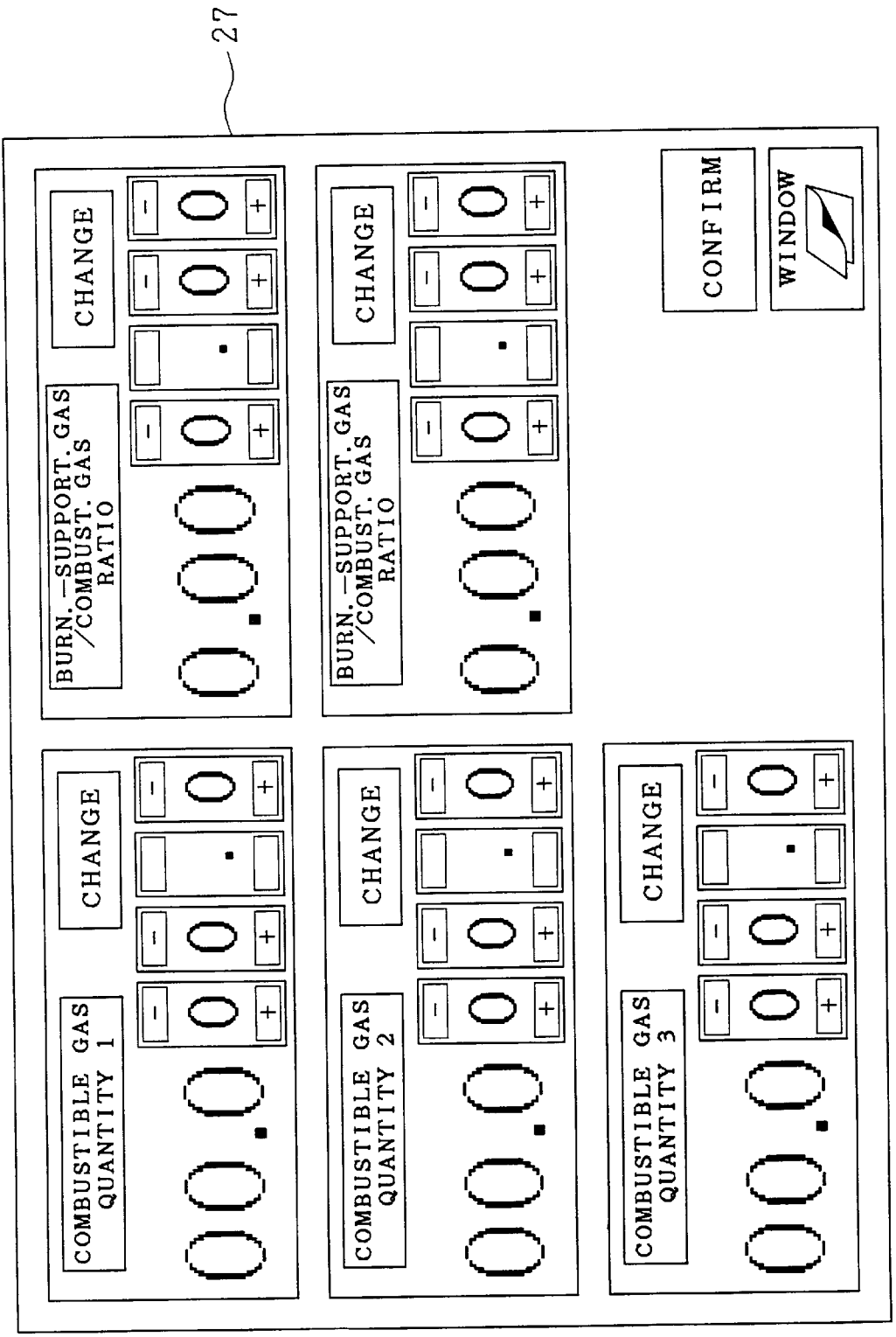
FIG. 10 shows a display for setting conditions of the amount of combustible gas and the ratio of burning-supporting gas/combustible gas in the graphic operation terminal 27 of FIG. 1.

FIG. 10 shows an operation display for setting gas flow rates for the preheating and the heating for soaking state.

The "COMBUSTIBLE GAS QUANTITY 1" is set by touch operation to set ($Q_1$=quantity of gas for preheating with strong flame). The ratio of flow rates between the combustible gas and the burning-supporting gas at this time is set by touch operation to "BURNING-SUPPORTING GAS/COMBUSTIBLE GAS RATIO" (S26, S27). The amount of burning-supporting gas for producing a reducing flame to prevent oxidation with the amount of combustible gas larger than that in the perfect combustion ratio depends on the theoretical amount of oxygen required for perfect combustion which varies depending on the constitution of the gas. With the natural gas (methane $CH_4$ 88%, ethane $C_2H_6$ 6%, propane $C_3H_8$, butane $C_4H_{10}$), for example, the standard mixing ratio ($O_2$/gas) for preheating flames is set to about 1.6 to 1.85. With propane $C_3H_8$ 95%, it is set so that the burning-supporting gas is excessive by about 20 to 30 percent, as a ratio from 3.8 to 4.2. When "CONFIRM" is touch-operated in this display, the display of the graphic operation terminal changes to that shown in FIG. 11.

Figure 11:
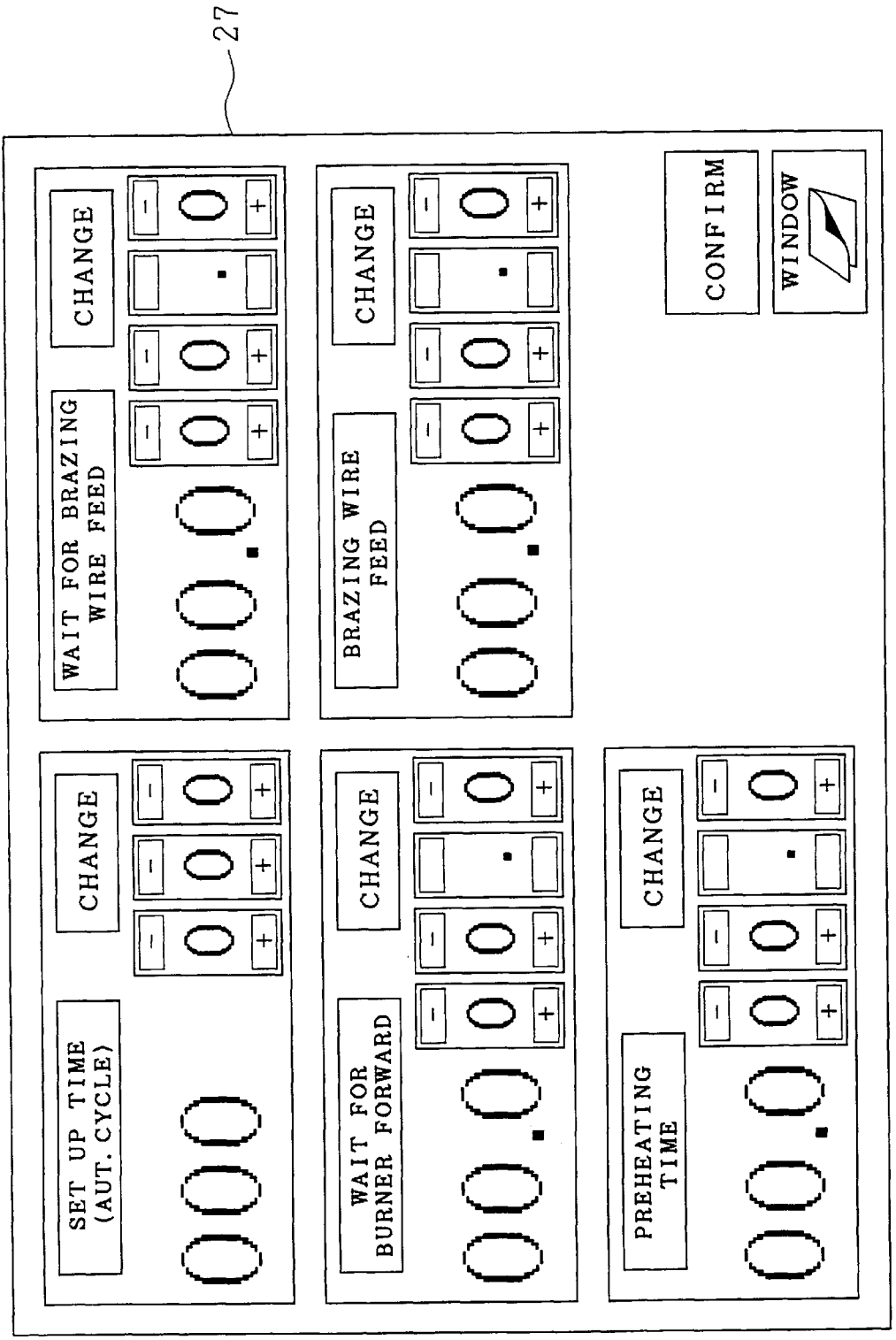
FIG. 11 shows an example of a display for setting operation timing of each step in the graphic operation terminal 27 of FIG. 1.

SOAKING TIME of FIG. 16 is set (S28, S29) by setting a time in "BRAZING WIRE SUPPLY WAIT" in the display of FIG. 11. Next, "AMOUNT OF BRAZING WIRE SUPPLIED" is set (S30, S31) by setting a time in "BRAZING WIRE SUPPLY". The "CONFIRM" is touch-operated to change the display of the graphic operation terminal to that shown in FIG. 12.

Figure 12:
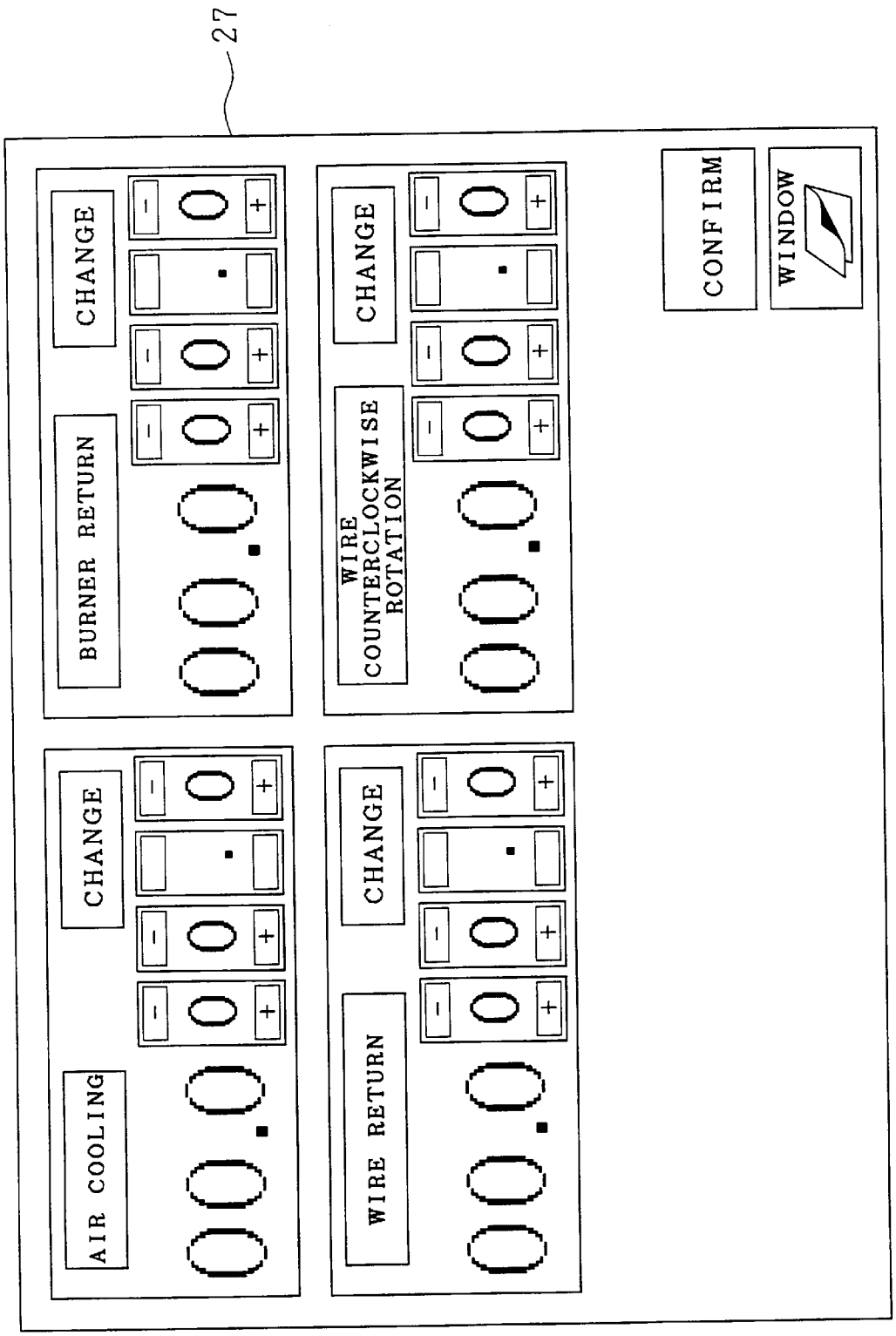
FIG. 12 shows another example of display for setting operation timing for each step in the graphic operation terminal 27 of FIG. 1.

In the display of FIG. 12, "WIRE COUNTERCLOCKWISE ROTATION" is touch-operated to remove slack of the brazing wire at the end of the nozzle in the condition where the supply of brazing wire is finished. Subsequently, the brazing wire nozzle is moved backward by the wire nozzle driving cylinder and the burner moving table 12 is moved backward (S32, S33). "CONFIRM" is touch-operated and then the automatic brazing program information is stored in the RAM 103.

Figure 15:
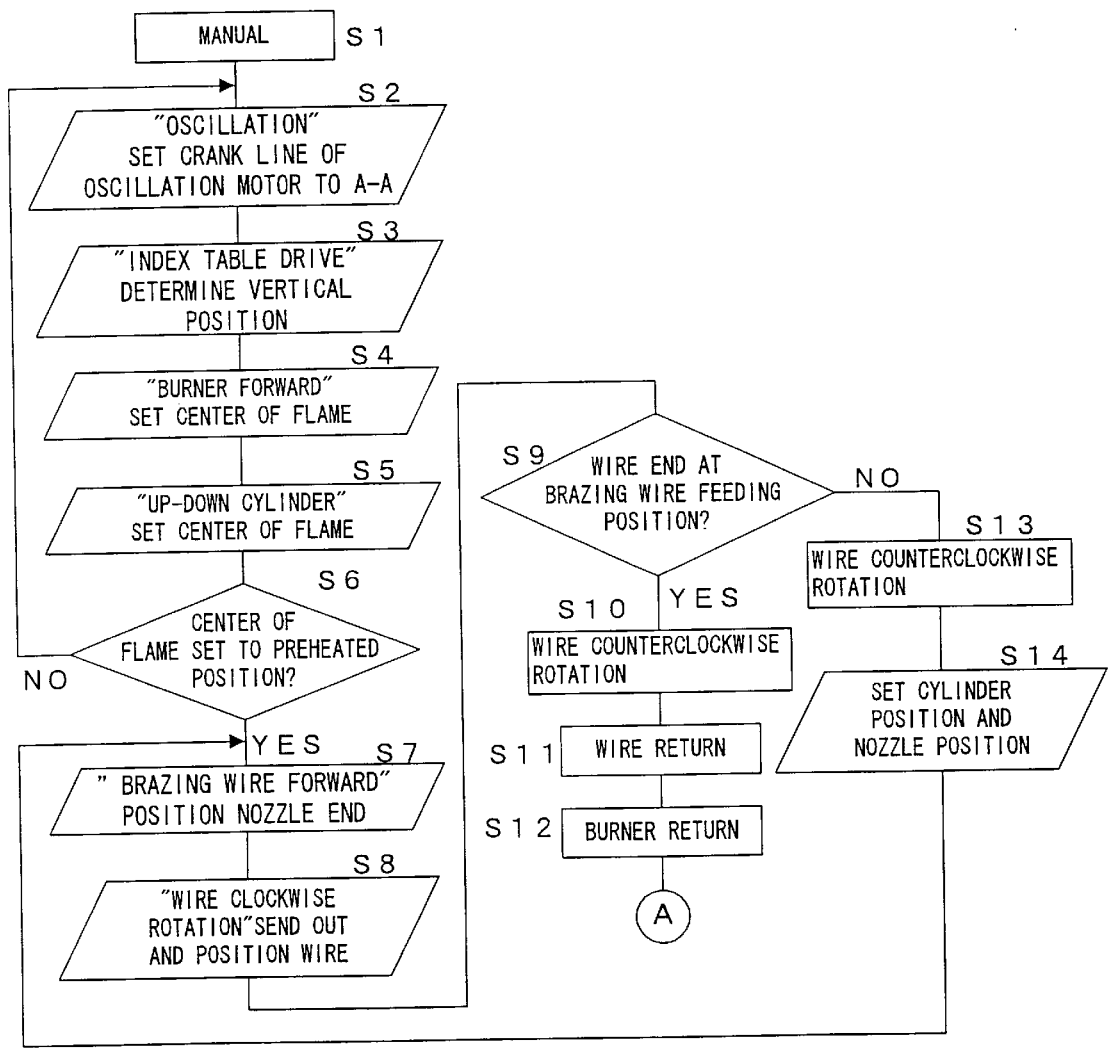
FIG. 15 is a flow chart showing contents of processing by manual operation for setting conditions in the device control in the automatic brazing device of FIG. 1.

This way, the teaching for positioning the devices is completed in the flow chart of FIG. 15 and the teaching in the program aspect is completed in the flow chart of FIG. 16.

Figure 17:
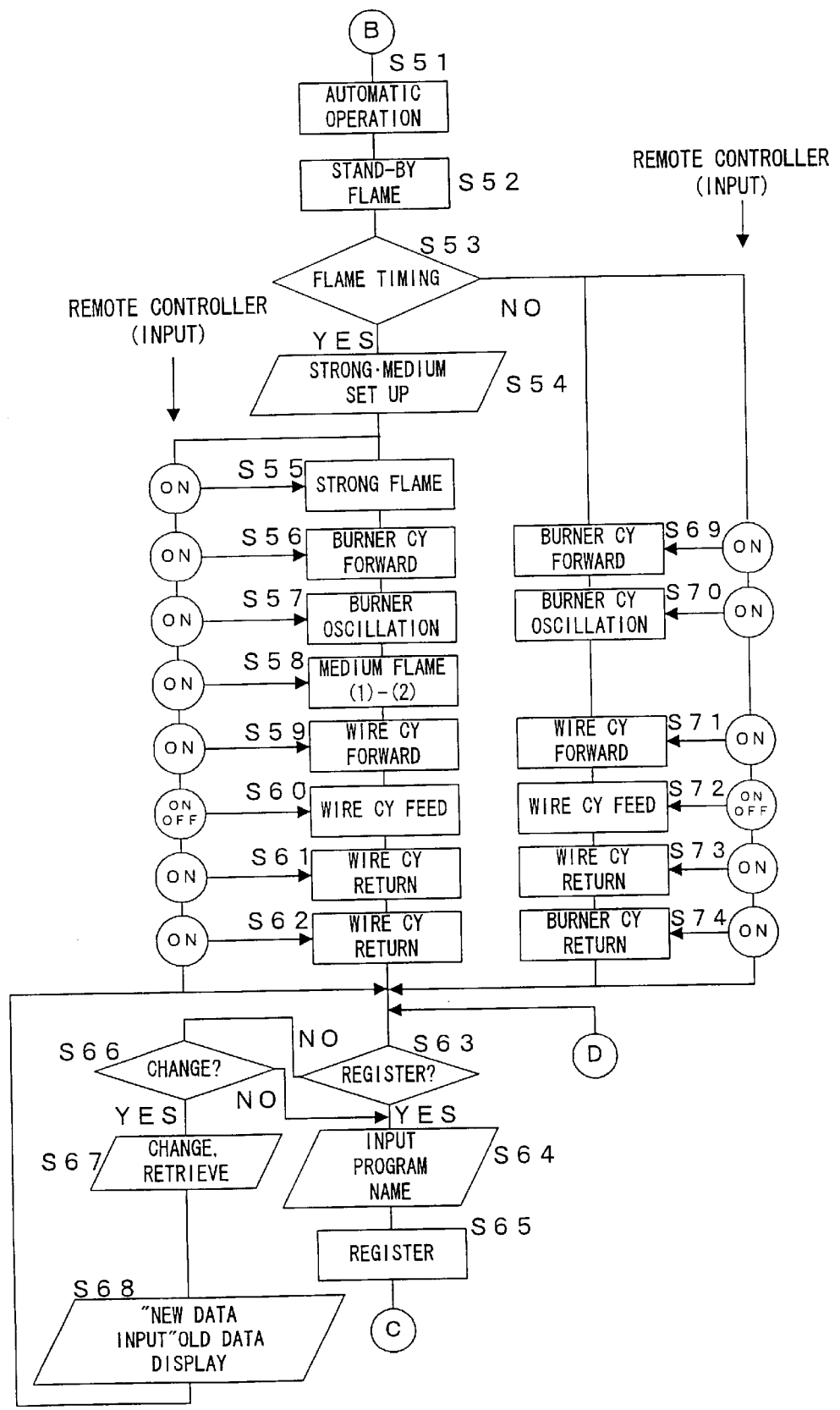
FIG. 17 is a flow chart showing specific contents when the teaching processing is performed using a remote controller in the automatic brazing device of FIG. 1.

FIG. 17 shows a flow chart for performing teaching while actually producing a brazing sample. FIG. 17 shows teaching by a switch of a remote controller with "ON" and "OFF" because the same flow chart is used when the teaching is done on a graphic operation terminal and when it is done with a remote controller in such a place that the brazing condition of the joined material can be easily observed.

Figure 13:
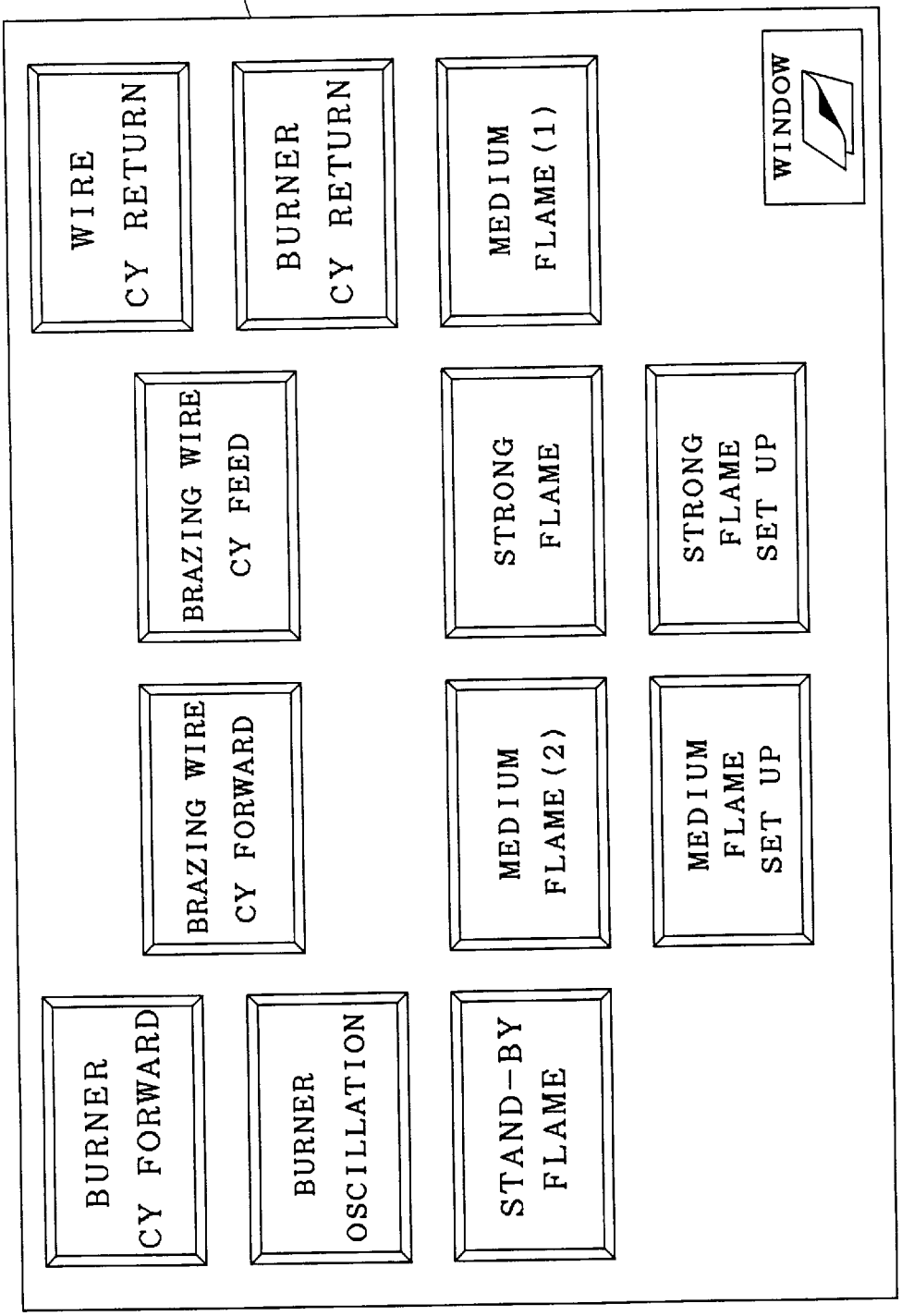
FIG. 13 shows a display for performing teaching processing in the graphic operation terminal 27 of FIG. 1.

Prior to the operation, a gas supply valve (not shown) is opened and "AUTOMATIC OPERATION" is touch-operated in the operation display of FIG. 6 (S51), and then the display for automatic operation of FIG. 13 is displayed. In this display, touch-operating "STAND-BY FLAME" causes the burner to fire (S52). In the teaching, the timing of the flame may be inputted, or the timing of the flame may be automatically switched according to the above-described teaching input or the standard program. The teaching method includes the method in which the operating timing is inputted by touch-operating the display of FIG. 13 and the remote controller method in which the inputs of FIG. 17 are sequentially performed by operating a touch switch of the remote controller 30 shown in FIG. 1 in a place where the heating condition of the brazed portion is most easily monitored.

When the fire timings are inputted, one or both of "SET STRONG FLAME" and "SET MEDIUM FLAME" of FIG. 13 are inputted by touch (S54). Then, the burner achieves the preheating flame of $Q_1$ when "STRONG FLAME" is touch-operated (S55). Then it is made sure that the flame of the burner is stable and "BURNER CY FORWARD" is operated (S56), and then the brazing unit moving table 28 advances. Then, "BURNER OSCILLATION" is touch-operated (S57) so that the oscillation motor 26 rotates to cause the flame of the burner to preheat the brazed part while reciprocating in the locus on the brazing wire supplied portion (1)-(2) shown in FIG. 14. The heated condition is checked and then "MEDIUM FLAME (1)" is touch-operated at the temperature $T_1$, which is not overheated, and then the software servo control is started.

Touch-operating MEDIUM FLAME (2) causes heating for soaking state (S58). Then touch-operating "WIRE CY FORWARD" (S59) causes the nozzle driving cylinder 9 to operate to bring the brazing wire nozzle close to the flame near the brazed material, which stands by there. Next, "WIRE CY FEED" is timely operated (S60) to supply the brazing wire. While it is being touched, the brazing wire supply motor 19 continues rotating. When the touch is released, the rotation stops and the supply of brazing wire stops (S61). Next, "WIRE CY RETURN" is touch-operated and the burner CY returns to the origin and the fire goes out (S62).

When the above-described teaching processing is done with the remote controller 30, it is possible to set timing by switch input at hand while directly monitoring by eyes the conditions of (heating the brazed material) to (supply of brazing wire), instead of viewing the screen, just like a skilled worker sets the (heating) to (brazing wire supply) timing. That is to say, set items having contents completely identical to those of the touch operation on the panel described above can be sequentially provided each by single "on" input to the remote controller. Only at the time of "SUPPLY WIRE", an "on" signal is continuously provided while the switch is being touched and an "off" signal is provided when the switch is released, as in the case of panel input.

By touch-operating "CHANGE RETRIEVAL" (not shown) while checking the sample brazed in the above operation to examine the operation timing, it is possible to compare and check the values inputted in the teaching in the program aspect with the displays of FIG. 9 to FIG. 12 and the actual values inputted while monitoring the conditions of brazing (S66, S67). On the basis of the numerical comparison and the quality of finish of the sample, new data is inputted for correction (S68). Next, "PROGRAM NAME" corresponding to the input data is inputted and "REGISTRATION" is touch-operated to store the contents into the RAM (S65) to enable mass production with repeating work.

The teaching process with the setting of the fire timing omitted can be performed in the same way (S69–S74).

Figure 18:
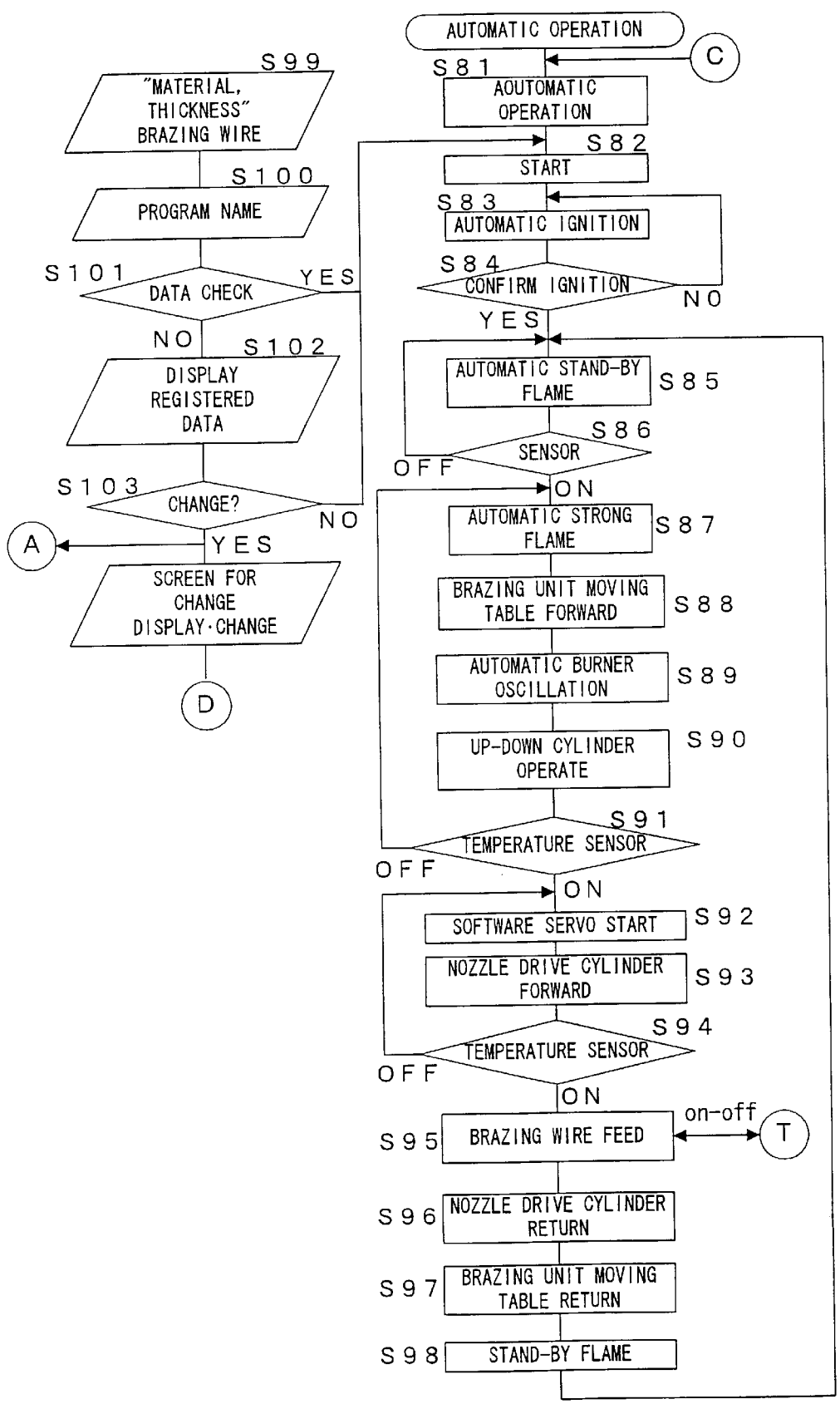
FIG. 18 is a flow chart showing specific operating contents in the case of automatic operation in the automatic brazing device of FIG. 1.

FIG. 18 shows a flow chart of a procedure for mass production of brazed parts.

"AUTOMATIC OPERATION" is touch-operated in the display of FIG. 6 (S81) and a combination of joined parts, etc. are inputted in the display of FIG. 8 (S99), and then a program name already registered is displayed (S100). It is selected and "START" is touch-operated (S82), then the control of the equipment automatically proceeds on the basis of the contents of the data instructions called from the RAM 103, ROM 101 of the CPU unit 41 (S83–S98). "AMOUNT OF BRAZING WIRE FEED" can be corrected by external input even during the automatic operation (S95).

As has been explained in the embodiment above, when the combustible gas flow rate is set with the gas flow rate setting means and the ratio between the combustible gas flow rate and the burning-supporting gas flow rate is set with the gas ratio setting means, the CPU 101 outputs a combustible gas flow rate setting reference signal and a burning-supporting gas flow rate setting reference signal, on the basis of which the comparing means controls the respective control valves to eliminate the differences from the gas flow rates detected by the respective flow rate detecting means to control the flow rates of the combustible gas and the burning-supporting gas. This enables digital control of the heating power, which enables heating power control by the software servo system with digitized heating amounts most suitable for various kinds of joined materials.

Furthermore, since the ratio in amount between the burning-supporting gas and the combustible gas can be arbitrarily set, it is possible to prevent oxidation by using reducing flames with excessive gas depending on the degree of oxidation of joined materials caused by heating and to facilitate flow of brazing wire, enabling reliable brazing. Moreover, when switching the brazing for multiple kinds of joined materials, conditions can be easily set by touch operation on a panel. When this input is made by a remote controller, it is possible to easily set the most suitable brazing timings while monitoring the actual operation.

In repeating mass production, programs already registered by the setting of conditions and the like can be taken out only by touch-inputting registered numbers, which enables mass production of brazed parts of the same quality. It is also easy to finely adjust the operation timings in case of poor conditions, and it is possible to record still better programs by inputting more excellent conditions every time production is repeated, providing an automatic brazing device still easier to use.

Although a flow rate of combustible gas and a gas ratio are inputted in the embodiment above, a flow rate of burning-supporting gas and a gas ratio may be inputted instead to obtain desired flow rates of combustible gas and burning-supporting gas.

Although "ON" and "OFF" switch operation with a remote controller is used in the teaching process performed while visually monitoring the brazing work in the embodiment above, it may be constructed so that the teaching can be achieved by speech input instead of the switch input.

While the invention has been described in detail, the foregoing description is in all aspects illustrative and not restrictive. It is understood that numerous other modifications and variations can be devised without departing from the scope of the invention.

We claim:

1. A gas flow rate control device disposed between a gas burner and a first gas source for supplying a first gas and a second gas source for supplying a second gas connected to said gas burner, comprising:

gas flow rate setting means for setting a flow rate of said first gas to be supplied to said gas burner;

gas ratio setting means for setting a gas ratio between the flow rate of said first gas and a flow rate of said second gas to be supplied to said gas burner;

a first control valve for controlling the amount of said first gas supplied to said gas burner;

a second control valve for controlling the amount of said second gas supplied to said gas burner; and control means for controlling said first and second control valves on the basis of said set flow rate of said first gas and said set gas ratio so that the amounts of said first gas and said second gas supplied to said gas burner correspond to said set flow rates.

2. The gas flow rate control device according to claim 1, wherein said first gas is a combustible gas and said second gas is a burning-supporting gas.

3. The gas flow rate control device according to claim 2, wherein said first gas flow rate setting means sets a plurality of combustible gas flow rates and said gas ratio setting means sets one or more gas ratios, and said gas flow rate control device further comprises heating pattern setting means for setting a heating pattern for an object heated by said gas burner, wherein said control means selects a desired combustible gas flow rate and a desired gas ratio from said set combustible gas flow rates and gas ratios on the basis of said set heating pattern.

4. The gas flow rate control device according to claim 3, wherein said set gas ratios include a gas ratio in which the amount of combustible gas is larger than that in a gas ratio for perfect combustion with the combustible gas and the burning-supporting gas.

5. A brazing device, comprising:

gas flow rate control means disposed between a heating torch and a combustible gas source for supplying a combustible gas and a burning-supporting gas source for supplying a burning-supporting gas connected to said heating torch;

said gas flow rate control means comprising, a gas flow rate setting portion for setting a flow rate of said combustible gas to be supplied to said heating torch, a gas ratio setting portion for setting a gas ratio between the flow rate of said combustible gas and a flow rate of said burning-supporting gas to be supplied to said heating torch, a first control valve for controlling the amount of said combustible gas supplied to said heating torch, a second control valve for controlling the amount of said burning-supporting gas supplied to said heating torch, and a control portion for controlling said first and second control valves on the basis of said combustible gas flow rate set and said gas ratio set so that the amounts of said combustible gas and said burning-supporting gas supplied to said heating torch correspond to said flow rates set, and said brazing device further comprising:

driving means for driving said heating torch; and control means for controlling said driving means so that said heating torch comes closer to a brazed part to bring a certain area of said brazed part to a desired temperature before brazing.

6. The brazing device according to claim 5, further comprising temperature detecting means for detecting a temperature in said certain area of said brazed part, wherein said control means controls said control portion on the basis of said detected temperature so that the flow rate of said combustible gas by said gas flow rate setting portion corresponds to a desired value.

7. The brazing device according to claim 6, further comprising setting means capable of setting control operation in each step in brazing operation, and storing means for storing said set control operation.

8. The brazing device according to claim 7, wherein said setting means includes a signal input switch into which a signal is inputted by a hand touch, which sets a time elapsing between the previous hand touch and the present hand touch as an operation time for one step.

9. The brazing device according to claim 7, wherein said setting means includes a signal input switch into which a signal is continuously inputted during a hand touch, which sets a time period of the hand touch as an operation time for one step.

10. The brazing device according to claim 9, wherein said setting means can set control operations depending on a combination of the kind of brazing wire and the kind of the brazed part.

11. The brazing device according to claim 9, wherein said signal input switch is disposed in such a position that said brazed part can be visually seen.

12. The brazing device according to claim 5, further comprising setting means capable of setting control operation in each step in brazing operation, and storing means for storing said set control operation.

13. The brazing device according to claim 8, wherein said setting means can set control operations depending on a combination of the kind of brazing wire and the kind of the brazed part.

14. The brazing device according to claim 8, wherein said signal input switch is disposed in such a position that said brazed part can be visually seen.

* * * * *